(12) United States Patent
Hausauer et al.

(10) Patent No.: US 8,458,280 B2
(45) Date of Patent: Jun. 4, 2013

(54) APPARATUS AND METHOD FOR PACKET TRANSMISSION OVER A HIGH SPEED NETWORK SUPPORTING REMOTE DIRECT MEMORY ACCESS OPERATIONS

(75) Inventors: Brian S. Hausauer, Austin, TX (US); Tristan T. Gross, Austin, TX (US); Kenneth G. Keels, Georgetown, TX (US); Shaun V. Wandler, Austin, TX (US)

(73) Assignee: Intel-NE, Inc., Santa Clara, CA (US)

( * ) Notice: Subject to any disclaimer, the term of this patent is extended or adjusted under 35 U.S.C. 154(b) by 1301 days.

(21) Appl. No.: 11/315,685

(22) Filed: Dec. 22, 2005

(65) Prior Publication Data

US 2006/0230119 A1   Oct. 12, 2006

Related U.S. Application Data

(60) Provisional application No. 60/669,842, filed on Apr. 8, 2005.

(51) Int. Cl.
*G06F 15/167* (2006.01)

(52) U.S. Cl.
USPC .......................................... 709/212; 709/216

(58) Field of Classification Search
USPC .............................................. 709/216, 212
See application file for complete search history.

(56) References Cited

U.S. PATENT DOCUMENTS

| | | | |
|---|---|---|---|
| 5,400,326 A | 3/1995 | Smith | |
| 5,434,976 A | 7/1995 | Tan et al. | |
| 5,758,075 A | 5/1998 | Graziano et al. | |
| 5,832,216 A | 11/1998 | Szczepanek | |
| 5,953,511 A | 9/1999 | Sescila, III et al. | |
| 6,052,751 A | 4/2000 | Runaldue et al. | |
| 6,067,300 A | 5/2000 | Baumert et al. | |
| 6,145,045 A | 11/2000 | Falik et al. | |
| 6,199,137 B1 | 3/2001 | Aguilar et al. | |
| 6,243,787 B1 | 6/2001 | Kagan et al. | |
| 6,389,479 B1 | 5/2002 | Boucher et al. | |
| 6,400,730 B1 | 6/2002 | Latif et al. | |
| 6,408,347 B1 | 6/2002 | Smith et al. | |
| 6,418,201 B1 | 7/2002 | Holland et al. | |

(Continued)

OTHER PUBLICATIONS

Response to Non-Final Office Action received for U.S. Appl. No. 11/356,501, filed Nov. 6, 2008, 16 pages.

(Continued)

*Primary Examiner* — Kevin Bates
*Assistant Examiner* — Tom Y Chang
(74) *Attorney, Agent, or Firm* — Christopher K. Gagne

(57) ABSTRACT

A mechanism for performing remote direct memory access (RDMA) operations between a first server and a second server over an Ethernet fabric. The RDMA operations are initiated by execution of a verb according to a remote direct memory access protocol. The verb is executed by a CPU on the first server. The apparatus includes transaction logic that is configured to process a work queue element corresponding to the verb, and that is configured to accomplish the RDMA operations over a TCP/IP interface between the first and second servers, where the work queue element resides within first host memory corresponding to the first server. The transaction logic includes transmit history information stores and a protocol engine. The transmit history information stores maintains parameters associated with said work queue element. The protocol engine is coupled to the transmit history information stores and is configured to access the parameters to enable retransmission of one or more TCP segments corresponding to the RDMA operations.

27 Claims, 8 Drawing Sheets

U.S. PATENT DOCUMENTS

| | | | |
|---|---|---|---|
| 6,427,171 | B1 | 7/2002 | Craft et al. |
| 6,502,156 | B1 | 12/2002 | Sacker et al. |
| 6,535,518 | B1 | 3/2003 | Hu et al. |
| 6,591,310 | B1 | 7/2003 | Johnson |
| 6,594,329 | B1 | 7/2003 | Susnow |
| 6,594,712 | B1 | 7/2003 | Pettey et al. |
| 6,601,126 | B1 | 7/2003 | Zaidi et al. |
| 6,625,157 | B2 | 9/2003 | Niu et al. |
| 6,658,521 | B1 | 12/2003 | Biran et al. |
| 6,661,773 | B1 | 12/2003 | Pelissier et al. |
| 6,675,200 | B1 | 1/2004 | Cheriton et al. |
| 6,690,757 | B1 | 2/2004 | Bunton et al. |
| 6,693,901 | B1 | 2/2004 | Byers et al. |
| 6,694,394 | B1 | 2/2004 | Bachrach |
| 6,697,868 | B2 | 2/2004 | Craft et al. |
| 6,704,831 | B1 | 3/2004 | Avery |
| 6,751,235 | B1 | 6/2004 | Susnow et al. |
| 6,760,307 | B2 | 7/2004 | Dunning et al. |
| 6,763,419 | B2 | 7/2004 | Hoese et al. |
| 6,778,548 | B1 | 8/2004 | Burton et al. |
| 7,093,024 | B2 | 8/2006 | Craddock et al. |
| 7,149,817 | B2 | 12/2006 | Pettey |
| 7,149,819 | B2 | 12/2006 | Pettey |
| 7,177,941 | B2 | 2/2007 | Biran et al. |
| 7,299,266 | B2 | 11/2007 | Boyd et al. |
| 7,308,551 | B2 | 12/2007 | Arndt et al. |
| 7,376,755 | B2 | 5/2008 | Pandya |
| 7,376,765 | B2 | 5/2008 | Rangan et al. |
| 7,376,770 | B2 | 5/2008 | Arndt et al. |
| 7,383,483 | B2 | 6/2008 | Biran et al. |
| 7,392,172 | B2 | 6/2008 | Rostampour |
| 7,401,126 | B2 | 7/2008 | Pekkala et al. |
| 7,426,674 | B2 | 9/2008 | Anderson et al. |
| 7,451,197 | B2 | 11/2008 | Davis et al. |
| 7,688,838 | B1 | 3/2010 | Aloni et al. |
| 7,782,869 | B1 | 8/2010 | Srinivasa et al. |
| 7,782,905 | B2 | 8/2010 | Keels et al. |
| 7,843,906 | B1 | 11/2010 | Chidambaram et al. |
| 7,849,232 | B2 | 12/2010 | Sharp et al. |
| 7,889,762 | B2 | 2/2011 | Keels et al. |
| 2001/0049740 | A1 | 12/2001 | Karpoff |
| 2002/0073257 | A1 | 6/2002 | Beukema et al. |
| 2002/0085562 | A1 | 7/2002 | Hufferd et al. |
| 2002/0147839 | A1 | 10/2002 | Boucher et al. |
| 2002/0161919 | A1 | 10/2002 | Boucher et al. |
| 2002/0172195 | A1 | 11/2002 | Pekkala et al. |
| 2003/0031172 | A1 | 2/2003 | Grinfeld |
| 2003/0050990 | A1 | 3/2003 | Craddock et al. |
| 2003/0097428 | A1* | 5/2003 | Afkhami et al. ............ 709/220 |
| 2003/0165160 | A1 | 9/2003 | Minami et al. |
| 2003/0169775 | A1 | 9/2003 | Fan et al. |
| 2003/0200284 | A1 | 10/2003 | Philbrick et al. |
| 2003/0217185 | A1 | 11/2003 | Thakur et al. |
| 2003/0237016 | A1 | 12/2003 | Johnson et al. |
| 2004/0010545 | A1 | 1/2004 | Pandya |
| 2004/0010594 | A1* | 1/2004 | Boyd et al. ............ 709/227 |
| 2004/0015622 | A1 | 1/2004 | Avery |
| 2004/0030770 | A1 | 2/2004 | Pandya |
| 2004/0037319 | A1 | 2/2004 | Pandya |
| 2004/0049600 | A1 | 3/2004 | Boyd et al. |
| 2004/0049774 | A1* | 3/2004 | Boyd et al. ............ 719/312 |
| 2004/0062267 | A1 | 4/2004 | Minami et al. |
| 2004/0083984 | A1* | 5/2004 | White ............ 119/752 |
| 2004/0085984 | A1 | 5/2004 | Elzur |
| 2004/0093389 | A1 | 5/2004 | Mohamed et al. |
| 2004/0093411 | A1 | 5/2004 | Elzur et al. |
| 2004/0098369 | A1 | 5/2004 | Elzur |
| 2004/0100924 | A1* | 5/2004 | Yam ............ 370/328 |
| 2004/0153578 | A1 | 8/2004 | Elzur |
| 2004/0193908 | A1* | 9/2004 | Garcia et al. ............ 713/200 |
| 2004/0221276 | A1 | 11/2004 | Raj |
| 2005/0044264 | A1 | 2/2005 | Grimminger et al. |
| 2005/0080982 | A1 | 4/2005 | Vasilevsky et al. |
| 2005/0102682 | A1 | 5/2005 | Shah et al. |
| 2005/0149623 | A1 | 7/2005 | Biran et al. |
| 2005/0220128 | A1 | 10/2005 | Tucker et al. |
| 2005/0223118 | A1* | 10/2005 | Tucker et al. ............ 709/250 |
| 2005/0265352 | A1* | 12/2005 | Biran et al. ............ 370/395.52 |
| 2006/0045098 | A1 | 3/2006 | Krause |
| 2006/0075067 | A1* | 4/2006 | Blackmore et al. ............ 709/217 |
| 2006/0105712 | A1 | 5/2006 | Glass et al. |
| 2006/0126619 | A1 | 6/2006 | Teisberg et al. |
| 2006/0146814 | A1* | 7/2006 | Shah et al. ............ 370/389 |
| 2006/0193327 | A1 | 8/2006 | Arndt et al. |
| 2006/0195617 | A1 | 8/2006 | Arndt et al. |
| 2006/0235977 | A1 | 10/2006 | Wunderlich et al. |
| 2006/0236063 | A1 | 10/2006 | Hausauer et al. |
| 2006/0248047 | A1 | 11/2006 | Grier et al. |
| 2006/0251109 | A1 | 11/2006 | Muller et al. |
| 2006/0259644 | A1 | 11/2006 | Boyd et al. |
| 2006/0274787 | A1 | 12/2006 | Pong |
| 2007/0083638 | A1 | 4/2007 | Pinkerton et al. |
| 2007/0136554 | A1 | 6/2007 | Biran et al. |
| 2007/0150676 | A1 | 6/2007 | Arimilli et al. |
| 2007/0165672 | A1 | 7/2007 | Keels et al. |
| 2007/0168567 | A1 | 7/2007 | Boyd et al. |
| 2007/0168693 | A1 | 7/2007 | Pittman |
| 2007/0198720 | A1 | 8/2007 | Rucker |
| 2007/0208820 | A1 | 9/2007 | Makhervaks et al. |
| 2007/0226386 | A1 | 9/2007 | Sharp et al. |
| 2007/0226750 | A1 | 9/2007 | Sharp et al. |
| 2008/0028401 | A1 | 1/2008 | Geisinger |
| 2008/0043750 | A1 | 2/2008 | Keels et al. |
| 2008/0147822 | A1 | 6/2008 | Benhase et al. |
| 2008/0244577 | A1 | 10/2008 | Le et al. |
| 2009/0254647 | A1 | 10/2009 | Elzur et al. |
| 2010/0332694 | A1 | 12/2010 | Sharp et al. |
| 2011/0099243 | A1 | 4/2011 | Keels et al. |

OTHER PUBLICATIONS

Final Office Action received for U.S. Appl. No. 11/356,501, mailed on Jan. 22, 2009, 12 pages.
Response to Final Office Action received for U.S. Appl. No. 11/356,501, filed Apr. 2, 2009, 15 pages.
Notice of Allowance received for U.S. Appl. No. 11/356,501, mailed on Jun. 11, 2009, 8 pages.
Shah, et al., "Direct Data Placement over Reliable Transports (Version 1.0)", RDMA Consortium document, Oct. 2002, pp. 1-35.
"Intel Virtual Interface (VI) Architecture Performance Suite User's Guide", Preliminary Version V0.3, Intel Corporation, Dec. 16, 1998, 28 pages.
Jinzanki, "Construction of Virtual Private Distributed System of Comet", RWC 2000 Symposium, Japan, XP002243009, Jan. 2000, pp. 1-3.
Pathikonda, et al., "Virtual Interface (VI) Architecture Overview", Enterprise Server Group, Intel Corporation, Apr. 1998, pp. 1-33.
Speight, et al., "Realizing the Performance Potential of the Virtual Interface Architecture", Proceedings of the 13th international conference on Supercomputing, Rhodes, Greece, 1999, pp. 184-192.
Response to Non-Final Office Action received for U.S. Appl. No. 09/784,761, filed Jul. 12, 2006, 35 pages.
Non-Final Office Action received for U.S. Appl. No. 09/784,761, mailed on Feb. 14, 2006, 19 pages.
Response to Non-Final Office Action received for U.S. Appl. No. 09/784,761, filed Nov. 26, 2005, 34 pages.
Final Office Action received for U.S. Appl. No. 09/784,761, mailed on Jul. 29, 2005, 25 pages.
Response to Non-Final Office Action received for U.S. Appl. No. 09/784,761, filed Apr. 19, 2005, 34 pages.
Non-Final Office Action received for U.S. Appl. No. 09/784,761, mailed on Feb. 14, 2005, 24 pages.
Response to Non-Final Office Action received for U.S. Appl. No. 09/784,761, filed Sep. 29, 2004, 15 pages.
Non-Final Office Action received for U.S. Appl. No. 09/784,761, mailed on Jul. 12, 2004, 12 pages.
Non-Final Office Action received for U.S. Appl. No. 09/817,008, mailed on Jul. 9, 2004, 19 pages.
Response to Non-Final Office Action received for U.S. Appl. No. 09/817,008, filed Nov. 4, 2004, 19 pages.
Non-Final Office Action received for U.S. Appl. No. 09/817,008, mailed on Nov. 18, 2005, 23 pages.
Response to Non-Final Office Action received for U.S. Appl. No. 09/817,008, filed Apr. 18, 2006, 33 pages.

Final Office Action received for U.S. Appl. No. 09/817,008, mailed on Jul. 14, 2006, 7 pages.
Response to Final Office Action received for U.S. Appl. No. 09/817,008, filed Nov. 14, 2006, 40 pages.
Non-Final Office Action received for U.S. Appl. No. 09/817,008, mailed on Feb. 9, 2007, 17 pages.
Response to Non-Final Office Action received for U.S. Appl. No. 09/817,008, filed May 9, 2007, 5 pages.
Non-Final Office Action received for U.S. Appl. No. 09/817,008, mailed on Jul. 25, 2007, 19 pages.
Response to Non-Final Office Action received for U.S. Appl. No. 09/817,008, filed Nov. 26, 2007, 21 pages.
Notice of Allowance received for U.S. Appl. No. 09/817,008, mailed on Mar. 28, 2008, 23 pages.
Amendment after Notice of Allowance received for U.S. Appl. No. 09/817,008, filed Apr. 2, 2008, 20 pages.
Non-Final Office Action received for U.S. Appl. No. 11/357,446, mailed on Jun. 3, 2008, 24 pages.
Response to Non-Final Office Action received for U.S. Appl. No. 11/357,446, filed Nov. 10, 2008, 26 pages.
Final Office Action received for U.S. Appl. No. 11/357,446, mailed on Dec. 31, 2008, 22 pages.
Non-Final Office Action received for U.S. Appl. No. 11/357,445, mailed on Aug. 4, 2008, 18 pages.
Response to Non-Final Office Action received for U.S. Appl. No. 11/357,445, filed Nov. 7, 2008, 19 pages.
Final Office Action received for U.S. Appl. No. 11/357,445, mailed on Dec. 24, 2008, 19 pages.
Response to Final Office Action received for U.S. Appl. No. 11/357,445, filed Mar. 4, 2009, 18 pages.
Non-Final Office Action received for U.S. Appl. No. 11/357,445, mailed on Apr. 24, 2009, 21 pages.
Non-Final Office Action received for U.S. Appl. No. 11/357,449, mailed on Jun. 4, 2009, 13 pages.
Non-Final Office Action received for U.S. Appl. No. 10/737,556, mailed on Jul. 6, 2004, 10 pages.
Supplemental Non-Final Office Action received for U.S. Appl. No. 10/737,556, mailed on Sep. 21, 2004, 8 pages.
Response to Supplemental Non-Final Office Action received for U.S. Appl. No. 10/737,556, filed Oct. 12, 2004, 4 pages.
Non-Final Office Action received for U.S. Appl. No. 10/737,556, mailed on Jan. 26, 2005, 11 pages.
Response to Non-Final Office Action received for U.S. Appl. No. 10/737,556, filed Apr. 19, 2005, 24 pages.
Final Office Action received for U.S. Appl. No. 10/737,556, mailed on Jul. 28, 2005, 19 pages.
Response to Final Office Action received for U.S. Appl. No. 10/737,556, filed Nov. 26, 2005, 27 pages.
Non-Final Office Action received for U.S. Appl. No. 10/737,556, mailed on Feb. 14, 2006, 14 pages.
Response to Non-Final Office Action received for U.S. Appl. No. 10/737,556, filed Jul. 12, 2006, 31 pages.
Notice of Allowance received for U.S. Appl. No. 10/737,556, mailed on Oct. 3, 2006, 12 pages.
Notice of Allowance received for U.S. Appl. No. 09/784,761, mailed on Oct. 6, 2006, 14 pages.
Mayo, John S., "The role of microelectronics in communication", Scientific American, Sep. 1977, pp. 192-209.
Warmke, Doug, "Building Up Chips Using VHDL and Synthesis", System Design, Dec. 1994/Jan. 1995, 7 pages.
Non-Final Office Action received for U.S. Appl. No. 11/356,501, mailed on Dec. 26, 2007, 12 pages.
Response to Non-Final Office Action received for U.S. Appl. No. 11/356,501, filed Mar. 26, 2008, 16 pages.
Non-Final Office Action received for U.S. Appl. No. 11/356,501, mailed on Jul. 7, 2008, 10 pages.
Non-Final Office Action received for U.S. Appl. No. 11/356,493, mailed on Sep. 21, 2009, 26 Pages.
Response to Non-Final Office Action received for U.S. Appl. No. 11/357,445, filed Jul. 8, 2009, 18 Pages.
Response to Non-Final Office Action received for U.S. Appl. No. 11/357,449, filed Aug. 17, 2009, 19 Pages.

Notice of Allowance received for U.S. Appl. No. 11/356,501, mailed on Aug. 7, 2009, 22 Pages.
Final Office Action received for U.S. Appl. No. 11/357,445, mailed on Sep. 10, 2009, 43 Pages.
Amendment after Notice of Allowance received for U.S. Appl. No. 11/356,501, filed Oct. 8, 2009, 11 Pages.
Response to Final Office Action received for U.S. Appl. No. 11/357,445, filed Nov. 10, 2009, 17 Pages.
Notice of Allowance received for U.S Appl. No. 11/356,501, mailed on Nov. 24, 2009, 12 Pages.
Final Office Action received for U.S. Appl. No. 11/357,449, mailed on Nov. 18, 2009, 31 Pages.
Response to Non-Final Office Action received for U.S. Appl. No. 11/356,493, filed Nov. 17, 2009, 13 Pages.
Non-Final Office Action received for U.S. Appl. No. 11/624,849, mailed on Nov. 23, 2009, 34 Pages.
Non-Final Office Action received for U.S. Appl. No. 11/357,449, mailed on Dec. 21, 2009, 8 Pages.
Response to Final Office Action received for U.S. Appl. No. 11/357,449, filed Dec. 8, 2009, 13 Pages.
Non-Final Office Action received for U.S. Appl. No. 11/356,493, mailed on Feb. 3, 2010, 15 Pages.
Response to Office Action received for U.S. Appl. No. 11/624,849, filed Jan. 22, 2010, 15 Pages.
Response to Office Action received for U.S. Appl. No. 11/357,449, filed Mar. 4, 2010, 12 Pages.
Office Action received for U.S. Appl. No. 11/624,849, mailed on Mar. 10, 2010, 15 Pages.
Office Action received for U.S. Appl. No. 11/356,500, mailed on Mar. 18, 2010, 28 Pages.
Response to Office Action received for U.S. Appl. No. 11/624,849, filed Mar. 31, 2010, 14 Pages.
Response to Office Action received for U.S. Appl. No. 11/356,493, filed Apr. 2, 2010, 11 Pages.
Amendment after Notice of Allowance received for U.S. Appl. No. 11/356,501, filed Jan. 29, 2010, 10 Pages.
Office Action received for U.S. Appl. No. 11/356,493, mailed on Jul. 8, 2010, 17 pages.
Response to Office Action received for U.S. Appl. No. 11/624,849, filed Jul. 29, 2010, 12 pages.
Office Action received for U.S. Appl. No. 11/356,500, mailed on Aug. 3, 2010, 17 pages.
Notice of Allowance received for U.S. Appl. No. 11/356,501, mailed on Aug. 19, 2010, 15 pages.
Response to Office Action received for U.S. Appl. No. 11/356,493, filed Sep. 9, 2010, 9 pages.
Office Action received for the U.S. Appl. No. 11/356,493, mailed on Oct. 13, 2010, 17 pages.
Response to Office Action filed for U.S. Appl. No. 11/356,500, field Oct. 7, 2010, 10 pages.
Office Action received for U.S. Appl. No. 11/624,849, mailed on Oct. 14, 2010, 11 pages.
Response to Office Action received for U.S. Appl. No. 11/624,849, filed Dec. 8, 2010, 9 pages.
Notice of Allowance received for the U.S. Appl. No. 11/624,849, mailed on Dec. 20, 2010, 6 pages.
Office Action received for the U.S. Appl. No. 11/356,500, mailed on Dec. 21, 2010, 41 pages.
Response to Office Action received for the U.S. Appl. No. 11/356,493, filed Jan. 3, 2011, 10 pages.
Office Action received for U.S. Appl. No. 12/874,739, mailed on Jan. 19, 2011, 12 pages.
Office Action received for U.S. Appl. No. 11/356,493, mailed on Feb. 15, 2011, 17 pages.
Office Action received for the U.S. Appl. No. 11/356,500, mailed on Mar. 31, 2011, 14 pages.
Response to Office Action received for the U.S. Appl. No. 11/356,500, filed Mar. 17, 2011, 10 pages.
Response to Office Action received for U.S. Appl. No. 12/874,739, filed Mar. 3, 2011, 10 pages.
Office Action received for U.S. Appl. No. 11/356,501, mailed on Apr. 13, 2010, 16 Pages.

Response to Office Action received for U.S. Appl. No. 11/356,500, filed May 17, 2010, 15 pages.
Office Action received for U.S. Appl. No. 11/624,849, mailed on May 24, 2010, 11 Pages.
Response to Office Action received for U.S. Appl. No. 11/356,501, filed May 28, 2010, 14 Pages.
Notice of Allowance received for U.S. Appl. No. 11/357,449, mailed on Jun. 8, 2010, 13 Pages.
Office Action Received for U.S. Appl. No. 11/356,493, mailed on May 24, 2011, 18 Pages.
Response to Office Action Received for U.S. Appl. No. 11/356,493, filed Apr. 15, 2011, 10 Pages.
Notice of Allowance Received for U.S. Appl. No. 12/874,739, mailed on Jun. 1, 2011, 14 Pages.
Response to Office Action Received for U.S. Appl. No. 11/356,500, filed Jun. 10, 2011, 12 Pages.

* cited by examiner

*LAYERED PROTOCOL FOR REMOTE DIRECT MEMORY ACCESS OPERATIONS*

*MPA HEADER, MARKER, AND CRC ALIGNMENT WITHIN AN ETHERNET FRAME*

FLOW BETWEEN SERVERS

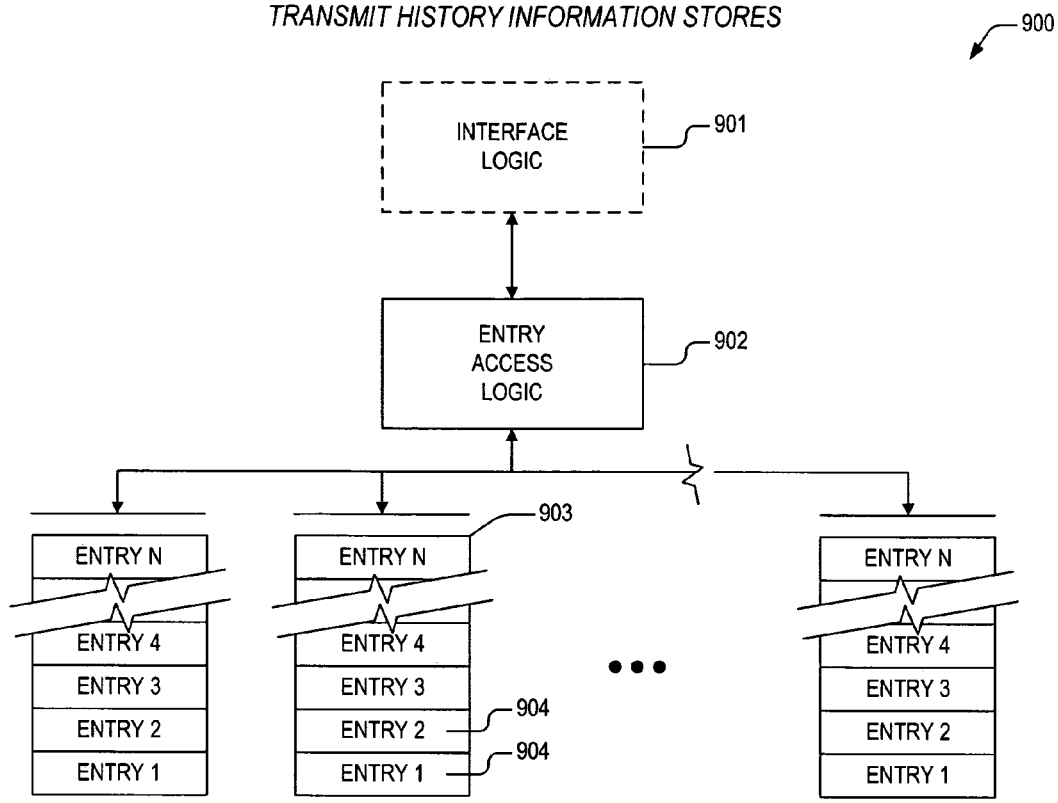

APPARATUS AND METHOD FOR PACKET TRANSMISSION OVER A HIGH SPEED NETWORK SUPPORTING REMOTE DIRECT MEMORY ACCESS OPERATIONS

CROSS-REFERENCE TO RELATED APPLICATIONS

This application claims the benefit of U.S. Provisional Application No. 60/669,842, filed on Apr. 8, 2005, which is herein incorporated by reference for all intents and purposes.

BACKGROUND OF THE INVENTION

1. Field of the Invention

This invention relates in general to the field of computer communications and more specifically to an apparatus and method for accelerating TCP/IP connections over an Ethernet fabric that is enabled to accomplish remote direct memory access (RDMA) operations.

2. Description of the Related Art

The first computers were stand-alone machines, that is, they loaded and executed application programs one-at-a-time in an order typically prescribed through a sequence of instructions provided by keypunched batch cards or magnetic tape. All of the data required to execute a loaded application program was provided by the application program as input data and execution results were typically output to a line printer. Even though the interface to early computers was cumbersome at best, the sheer power to rapidly perform computations made these devices very attractive to those in the scientific and engineering fields.

The development of remote terminal capabilities allowed computer technologies to be more widely distributed. Access to computational equipment in real-time fostered the introduction of computers into the business world. Businesses that processed large amounts of data, such as the insurance industry and government agencies, began to store, retrieve, and process their data on computers. Special applications were developed to perform operations on shared data within a single computer system.

During the mid 1970's, a number of successful attempts were made to interconnect computers for purposes of sharing data and/or processing capabilities. These interconnection attempts, however, employed special purpose protocols that were intimately tied to the architecture of these computers. As such, the computers were expensive to procure and maintain and their applications were limited to those areas of the industry that heavily relied upon shared data processing capabilities.

The U.S. government, however, realized the power that could be harnessed by allowing computers to interconnect and thus funded research that resulted in what we now know as the Internet. More specifically, this research resulted in a series of standards produced that specify the details of how interconnected computers are to communicate, how to interconnect networks of computers, and how to route traffic over these interconnected networks. This set of standards is known as the TCP/IP Internet Protocol Suite, named after its two predominant protocol standards, Transport Control Protocol (TCP) and Internet Protocol (IP). TCP is a protocol that allows for a reliable byte stream connection between two computers. IP is a protocol that provides an addressing and routing mechanism for unreliable transmission of datagrams across a network of computers. The use of TCP/IP allows a computer to communicate across any set of interconnected networks, regardless of the underlying native network protocols that are employed by these networks. Once the interconnection problem was solved by TCP/IP, networks of interconnected computers began to crop up in all areas of business.

The ability to easily interconnect computer networks for communication purposes provided the motivation for the development of distributed application programs, that is, application programs that perform certain tasks on one computer connected to a network and certain other tasks on another computer connected to the network. The sophistication of distributed application programs has steadily evolved over more recent years into what we today call the client-server model. According to the model, "client" applications on a network make requests for service to "server" applications on the network. The "server" applications perform the service and return the results of the service to the "client" over the network. In an exact sense, a client and a server may reside on the same computer, but the more common employment of the model finds clients executing on smaller, less powerful, less costly computers connected to a network and servers executing on more powerful, more expensive computers. In fact, the proliferation of client-server applications has resulted in a class of high-end computers being known as "servers" because they are primarily used to execute server applications. Similarly, the term "client machine" is often used to describe a single-user desktop system that executes client applications. Client-server application technology has enabled computer usage to be phased into the business mainstream. Companies began employing interconnected client-server networks to centralize the storage of files, company data, manufacturing data, etc., on servers and allowed employees to access this data via clients. Servers today are sometimes known by the type of services that they perform. For example, a file server provides client access to centralized files, a mail server provides access to a companies electronic mail, a data base server provides client access to a central data base, and so on.

The development of other technologies such as hypertext markup language (HTML) and extensible markup language (XML) now allows user-friendly representations of data to be transmitted between computers. The advent of HTML/XML-based developments has resulted in an exponential increase in the number of computers that are interconnected because, now, even home-based businesses can develop server applications that provide services accessible over the Internet from any computer equipped with a web browser application (i.e., a web "client"). Furthermore, virtually every computer produced today is sold with web client software. In 1988, only 5,000 computers were interconnected via the Internet. In 1995, under 5 million computers were interconnected via the Internet. But with the maturation of client-server and HTML technologies, presently, over 50 million computers access the Internet. And the growth continues.

The number of servers in a present day data center may range from a single server to hundreds of interconnected servers. And the interconnection schemes chosen for those applications that consist of more than one server depend upon the type of services that interconnection of the servers enables Today, there are three distinct interconnection fabrics that characterize a multi-server configuration. Virtually all multi-server configurations have a local area network (LAN) fabric that is used to interconnect any number of client machines to the servers within the data center. The LAN fabric interconnects the client machines and allows the client machines access to the servers and perhaps also allows client and server access to network attached storage (NAS), if provided. One skilled in the art will appreciate that TCP/IP over Ethernet is the most commonly employed protocol in use today for a LAN fabric, with 100 Megabit (Mb) Ethernet being the most common transmission speed and 1 Gigabit (Gb) Ethernet gaining prevalence in use. In addition, 10 Gb Ethernet links and associated equipment are currently being fielded.

The second type of interconnection fabric, if required within a data center, is a storage area network (SAN) fabric. The SAN fabric provides for high speed access of block storage devices by the servers. Again, one skilled in the art will appreciate that Fibre Channel is the most commonly employed protocol for use today for a SAN fabric, transmitting data at speeds up to 2 Gb per second, with 4 Gb per second components that are now in the early stages of adoption.

The third type of interconnection fabric, if required within a data center, is a clustering network fabric. The clustering network fabric is provided to interconnect multiple servers to support such applications as high-performance computing, distributed databases, distributed data store, grid computing, and server redundancy. A clustering network fabric is characterized by super-fast transmission speed and low-latency. There is no prevalent clustering protocol in use today, so a typical clustering network will employ networking devices developed by a given manufacturer. Thus, the networking devices (i.e., the clustering network fabric) operate according to a networking protocol that is proprietary to the given manufacturer. Clustering network devices are available from such manufacturers as Quadrics Inc. and Myricom. These network devices transmit data at speeds greater than 1 Gb per second with latencies on the order of microseconds. It is interesting, however, that although low latency has been noted as a desirable attribute for a clustering network, more than 50 percent of the clusters in the top 500 fastest computers today use TCP/IP over Ethernet as their interconnection fabric.

It has been noted by many in the art that a significant performance bottleneck associated with networking in the near term will not be the network fabric itself, as has been the case in more recent years. Rather, the bottleneck is now shifting to the processor. More specifically, network transmissions will be limited by the amount of processing required of a central processing unit (CPU) to accomplish TCP/IP operations at 1 Gb (and greater) speeds. In fact, the present inventors have noted that approximately 40 percent of the CPU overhead associated with TCP/IP operations is due to transport processing, that is, the processing operations that are required to allocate buffers to applications, to manage TCP/IP link lists, etc. Another 20 percent of the CPU overhead associated with TCP/IP operations is due to the processing operations which are required to make intermediate buffer copies, that is, moving data from a network adapter buffer, then to a device driver buffer, then to an operating system buffer, and finally to an application buffer. And the final 40 percent of the CPU overhead associated with TCP/IP operations is the processing required to perform context switches between an application and its underlying operating system which provides the TCP/IP services. Presently, it is estimated that it takes roughly 1 GHz of processor bandwidth to provide for a typical 1 Gb/second TCP/IP network. Extrapolating this estimate up to that required to support a 10 Gb/second TCP/IP network provides a sufficient basis for the consideration of alternative configurations beyond the TCP/IP stack architecture today, most of the operations of which are provided by an underlying operating system.

As alluded to above, it is readily apparent that TCP/IP processing overhead requirements must be offloaded from the processors and operating systems within a server configuration in order to alleviate the performance bottleneck associated with current and future networking fabrics. This can be accomplished in principle by 1) moving the transport processing requirements from the CPU down to a network adapter; 2) providing a mechanism for remote direct memory access (RDMA) operations, thus giving the network adapter the ability to transfer data directly to/from application memory; and 3) providing a user-level direct access technique that allows an application to directly command the network adapter to send/receive data, thereby bypassing the underlying operating system.

The INFINIBAND™ protocol was an ill-fated attempt to accomplish these three "offload" objectives, while at the same time attempting to increase data transfer speeds within a data center. In addition, INFINIBAND attempted to merge the three disparate fabrics (i.e., LAN, SAN, and cluster) by providing a unified point-to-point fabric that, among other things, completely replaced Ethernet, Fibre Channel, and vendor-specific clustering networks. On paper and in simulation, the INFINIBAND protocol was extremely attractive from a performance perspective because it enabled all three of the above objectives and increased networking throughput overall. Unfortunately, the architects of INFINIBAND overestimated the community's willingness to abandon their tremendous investment in existing networking infrastructure, particularly that associated with Ethernet fabrics. And as a result, INFINIBAND has not become a viable option for the marketplace.

INFINIBAND did, however, provide a very attractive mechanism for offloading reliable connection network transport processing from a CPU and corresponding operating system. One aspect of this mechanism is the use of "verbs." Verbs is an architected programming interface between a network input/output (I/O) adapter and a host operating system (OS) or application software, which enables 1) moving reliable connection transport processing from a host CPU to the I/O adapter; 2) enabling the I/O adapter to perform direct data placement (DDP) through the use of RDMA read messages and RDMA write messages, as will be described in greater detail below; and 3) bypass of the OS. INFINIBAND defined a new type of reliable connection transport for use with verbs, but one skilled in the art will appreciate that a verbs interface mechanism will work equally well with the TCP reliable connection transport. At a very high level, this mechanism consists of providing a set of commands ("verbs") which can be executed by an application program, without operating system intervention, that direct an appropriately configured network adapter (not part of the CPU) to directly transfer data to/from server (or "host") memory, across a network fabric, where commensurate direct data transfer operations are performed in host memory of a counterpart server. This type of operation, as noted above, is referred to as RDMA, and a network adapter that is configured to perform such operations is referred to as an RDMA-enabled network adapter. In essence, an application executes a verb to transfer data and the RDMA-enabled network adapter moves the data over the network fabric to/from host memory.

Many in the art have attempted to preserve the attractive attributes of INFINIBAND (e.g., reliable connection network transport offload, verbs, RDMA) as part of a networking protocol that utilizes Ethernet as an underlying network fabric. In fact, over 50 member companies are now part of what is known as the RDMA Consortium (www.rdmaconsortium.org), an organization founded to foster industry standards and specifications that support RDMA over TCP. RDMA over TCP/IP defines the interoperable protocols to support RDMA operations over standard TCP/IP networks. To date, the RDMA Consortium has released four specifications that provide for RDMA over TCP, as follows, each of which is incorporated by reference in its entirety for all intents and purposes:

> Hilland et al. "RDMA Protocol Verbs Specification (Version 1.0)." April, 2003. RDMA Consortium. Portland, Oreg. (http://www.rdmaconsortium.org/home/draft-hilland-iwarp-verbs-v1.0-rdmac. pdf).
>
> Recio et al. "An RDMA Protocol Specification (Version 1.0)." October 2002. RDMA Consortium. Portland, Oreg. (http://www.rdmaconsortium.org/home/draft-recio-iwarp-rdmap-v1.0.pdf).
>
> Shah et al. "Direct Data Placement Over Reliable Transports (Version 1.0)." October 2002. RDMA Consortium. Portland, Oreg. (http://www.rdmaconsortium.org/home/draft-shah-iwarp-ddp-v1.0.pdf).
>
> Culley et al. "Marker PDU Aligned Framing for TCP Specification (Version 1.0)." Oct. 25, 2002. RDMA Consortium. Portland, Oreg. (http://www.rdmaconsortium.org/home/draft-culley-iwarp-mpa-v1.0.pdf).

The RDMA Verbs specification and the suite of three specifications that describe the RDMA over TCP protocol have been completed. RDMA over TCP/IP specifies an RDMA layer that will interoperate over a standard TCP/IP transport layer. RDMA over TCP does not specify a physical layer; but will work over Ethernet, wide area networks (WAN), or any other network where TCP/IP is used. The RDMA Verbs specification is substantially similar to that provided for by INFINIBAND. In addition, the aforementioned specifications have been adopted as the basis for work on RDMA by the Internet Engineering Task Force (IETF). The IETF versions of the RDMA over TCP specifications follow.

> "Marker PDU Aligned Framing for TCP Specification (Sep. 27, 2005)" http://www.ietf.org/internet-drafts/draft-ietf-rddp-mpa-03.pdf
>
> "Direct Data Placement over Reliable Transports (July 2005)" http://www.ietf.org/internet-drafts/draft-ietf-rddp-ddp-05.txt
>
> "An RDMA Protocol Specification (Jul. 17, 2005)" http://www.ietf.org/internet-drafts/draft-ietf-rddp-rdmap-05.txt
>
> Remote Direct Data Placement (rddp) Working Group http://www.ietf.org/html.charters/rddp-charter.html In view of the above developments in the art, it is anticipated that RDMA over TCP/IP, with Ethernet as the underlying network fabric, will over the near term become as ubiquitous within data centers as are currently fielded TCP/IP-based fabrics. The present inventors contemplate that as RDMA over TCP/IP gains prevalence for use as a LAN fabric, data center managers will recognize that increased overall cost of ownership benefits can be had by moving existing SAN and clustering fabrics over to RDMA over TCP/IP as well.

But, as one skilled in the art will appreciate, TCP is a reliable connection transport protocol that provides a stream of bytes, with no inherent capability to demarcate message boundaries for an upper layer protocol (ULP). The RDMA Consortium specifications "Direct Data Placement Over Reliable Transports (Version 1.0)" and "Marker PDU Aligned Framing for TCP Specification (Version 1.0)," among other things specifically define techniques for demarcating RDMA message boundaries and for inserting "markers" into a message, or "protocol data unit" (PDU) that is to be transmitted over a TCP transport byte stream so that an RDMA-enabled network adapter on the receiving end can determine if and when a complete message has been received over the fabric. A marked PDU is referred to as a framed PDU (FPDU). An FPDU, however, is not a message per se. Rather, an FPDU is a portion of a ULP payload that is framed with a marker PDU aligned (MPA) header, and that has MPA markers inserted at regular intervals in TCP sequence space. The MPA markers are inserted to facilitate location of the MPA Header. A message consists of one or more direct data placement DDP segments, and has the following general types: Send Message, RDMA Read Request Message, RDMA Read Response Message, and RDMA Write Message. These techniques are required to enhance the streaming capability limitation of TCP and must be implemented by any RDMA-enabled network adapter.

The present inventors have noted that there are several problems associated with implementing an RDMA-enabled network adapter so that PDUs are reliably handled with acceptable latency over an TCP/IP Ethernet fabric. First and foremost, as one skilled in the art will appreciate, TCP does not provide for acknowledgement of messages. Rather, TCP provides for acknowledgement of TCP segments (or partial TCP segments), many of which may be employed to transmit a message under RDMA over TCP/IP. Yet, the RDMAC Verbs Specification requires that an RDMA-enabled adapter provide message completion information to the verbs user in the form of Completion Queue Elements (CQEs). And the CQEs are typically generated using inbound TCP acknowledgements. Thus, it is required that an RDMA-enabled network adapter be capable of rapidly determining if and when a complete message has been received. In addition, the present inventors have noted a requirement for an efficient mechanism to allow for reconstruction and retransmission of TCP segments under normal network error conditions such as dropped packets, timeout, and etc. It is furthermore required that a technique be provided that allows an RDMA-enabled network adapter to efficiently rebuild an FPDU (including correct placement of markers therein) under conditions where the maximum segment size (MSS) for transmission over the network fabric is dynamically changed.

SUMMARY OF THE INVENTION

The present invention, among other applications, is directed to solving the above-noted problems and addresses other problems, disadvantages, and limitations of the prior art. The present invention provides a superior technique for enabling efficient and effective rebuild, retransmission, and completion determination of messages sent over an RDMA-enabled TCP/IP Ethernet fabric. In one embodiment, an apparatus is provided, for performing remote direct memory access (RDMA) operations between a first server and a second server over an Ethernet fabric. The RDMA operations are initiated by execution of a verb according to a remote direct memory access protocol. The verb is executed by a CPU on the first server. The apparatus includes transaction logic that is configured to process a work queue element corresponding to the verb, and that is configured to accomplish the RDMA operations over a TCP/IP interface between the first and second servers, where the work queue element resides within first host memory corresponding to the first server. The transaction logic includes transmit history information stores and a protocol engine. The transmit history information stores maintains parameters associated with said work queue element. The protocol engine is coupled to the transmit history information stores and is configured to access the parameters to enable retransmission of one or more TCP segments corresponding to the RDMA operations.

One aspect of the present invention contemplates an apparatus for performing remote direct memory access (RDMA) operations between a first server and a second server over an Ethernet fabric. The RDMA operations are initiated by execution of a verb according to a remote direct memory access protocol. The verb is executed by a CPU on the first server. The apparatus has a first network adapter and a second network adapter. The first network adapter provides a work queue element responsive to execution of the verb, and transmits framed protocol data units (FPDUs) corresponding to the RDMA operations over a TCP/IP interface between the first and second servers, where the RDMA operations are responsive to the work queue element, and where the work queue element is provided within first host memory corresponding to the first server. The first network adapter includes transmit history information stores and a protocol engine. The transmit history information stores maintains parameters associated with the work queue element in a corresponding FIFO buffer entry. The protocol engine is coupled to the transmit history information stores. The protocol engine accesses the FIFO buffer entry to enable retransmission of one or more TCP segments corresponding to a subset of the FPDUs. The second network adapter receives the FPDUs, where reception of the FPDUs includes receiving the one or more TCP segments, whereby the RDMA operations are accomplished without error.

Another aspect of the present invention comprehends a method for performing remote direct memory access (RDMA) operations between a first server and a second server over an Ethernet fabric. The RDMA operations are initiated by execution of a verb according to a remote direct memory access protocol. The verb is executed by a CPU on the first server. The method includes processing a work queue element corresponding to the verb, where the work queue element resides within a work queue that is within first host memory corresponding to the first server; and accomplishing the RDMA operations over a TCP/IP interface between the first and second servers. The accomplishing includes maintaining parameters associated with the work queue element in a local FIFO buffer entry; and accessing the parameters to enable retransmission of one or more TCP segments corresponding to the RDMA operations.

BRIEF DESCRIPTION OF THE DRAWINGS

These and other objects, features, and advantages of the present invention will become better understood with regard to the following description, and accompanying drawings where:

FIG. 9 is a block diagram showing details of transmit history information stores within a network adapter according to the present invention; and FIG. 10 is a block diagram providing details of an exemplary transmit FIFO buffer entry according to the present invention.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on protocols that enable remote direct memory access and associated techniques employed within present day systems for accomplishing the offload of TCP/IP operations from a server CPU, a discussion of the present invention will now be presented with reference to FIGS. 1-10. Use of the present invention 1) permits servers to offload virtually all of the processing associated with TCP/IP operations; 2) employs Ethernet as an underlying network fabric; and 3) provides an efficient mechanism for rebuilding and retransmitting TCP segments in the event of network error and for signaling completion of one or more RDMA operations to a requesting consumer application.

Figure 1:
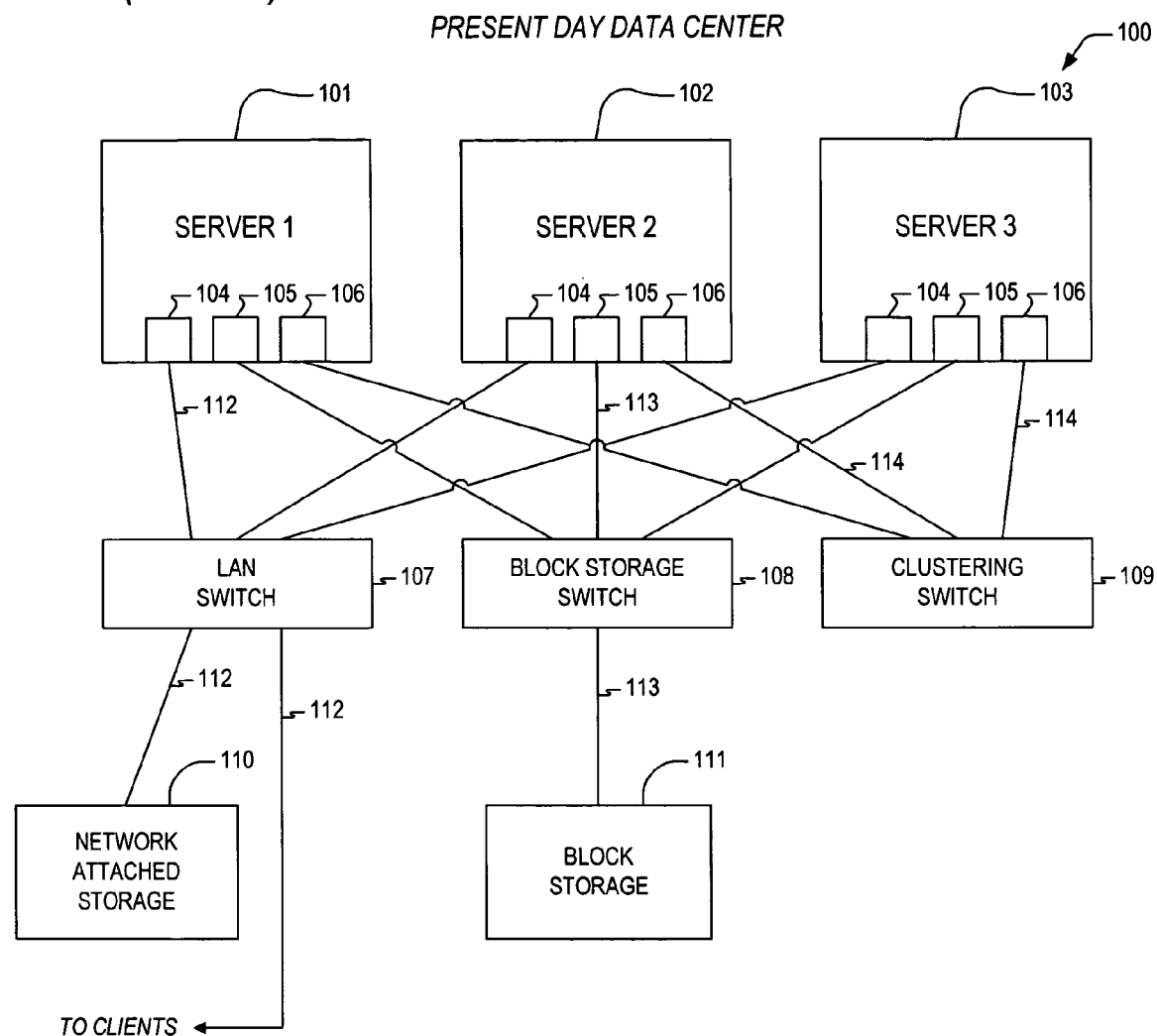
FIG. 1 is a related art diagram illustrating a typical present day data center that provides for a LAN fabric, a SAN fabric, and a clustering fabric.

Now referring to FIG. 1, a related art diagram is presented illustrating a typical present day multi-server configuration 100 within an exemplary data center that interconnects three servers 101-103 and that provides for a LAN, a SAN, and a cluster network. The servers 101-103 are interconnected over the LAN to clients and to network attached storage (NAS) 110 via a LAN fabric that consists of multiple point-to-point LAN links 112 that are interconnected via one or more LAN switches 107. The servers 101-103 each connect up to the LAN via a LAN network adapter 104. As alluded to above, virtually all present day LANs utilize TCP/IP over Ethernet as the networking protocol. The servers 101-103 are also interconnected over the SAN to one or more block storage devices 111 via a SAN fabric that consists of multiple point-to-point SAN links 113 that are interconnected via one or more SAN switches 108. The servers 101-103 each connect up to the SAN via a SAN network adapter 105. As is also noted above, most present day SANS utilize Fibre Channel as the networking protocol. And many installations employ the Small Computer Systems Interface (SCSI) protocol on top of Fibre Channel to enable transport of data to/from the block storage 111. The servers 101-103 are additionally interconnected over the cluster network to each other to allow for high performance computing applications as noted above. The cluster network consists of multiple point-to-point cluster links 114 that are interconnected via one or more clustering switches 109. The servers 101-103 each connect up to the cluster network via a cluster network adapter 106. As is also noted above, there is no industry standard for clustering networks, but companies such as Quadrics Inc. and Myricom produce proprietary cluster network adapters 106, clustering switches 109, and links 114 that support high-speed, low latency cluster fabrics.

From a total cost of ownership perspective, one skilled in the art will appreciate that a data center manager must maintain expertise and parts for three entirely disparate fabrics and must, in addition, field three different network adapters 104-106 for each server 101-103 that is added to the data center. In addition, one skilled in the art will appreciate that the servers 101-103 within the data center may very well be embodied as blade servers 101-103 mounted within a blade server rack (not shown) or as integrated server components 101-103 mounted within a single multi-server blade (not shown). For these, and other alternative data center configurations, it is evident that the problem of interconnecting servers over disparate network fabrics becomes more complicated as the level of integration increases.

Add to the above the fact that the underlying network speeds as seen on each of the links 112-114 is increasing beyond the processing capabilities of CPUs within the servers 101-103 for conventional networking. As a result, TCP offload techniques have been proposed which include 1) moving the transport processing duties from the CPU down to a network adapter; 2) providing a mechanism for remote direct memory access (RDMA) operations, thus giving the network adapter the ability to transfer data directly to/from application memory without requiring memory copies; and 3) providing a user-level direct access technique that allows an application to directly command the network adapter to send/receive data, thereby bypassing the underlying operating system.

As noted in the background the developments associated with INFINIBAND provided the mechanisms for performing TCP offload and RDMA through the use of verbs and associated RDMA-enabled network adapters. But the RDMA-enabled network adapters associated with INFINIBAND employed INFINIBAND-specific networking protocols down to the physical layer which were not embraced by the networking community.

Yet, the networking community has endeavored to preserve the advantageous features of INFINIBAND while exploiting the existing investments that they have made in TCP/IP infrastructure. As mentioned earlier, the RDMA Consortium has produced standards for performing RDMA operations over standard TCP/IP networks, and while these standards do not specify a particular physical layer, it is anticipated that Ethernet will be widely used, most likely 10 Gb Ethernet, primarily because of the tremendous base of knowledge of this protocol that is already present within the community.

The present inventors have noted the need for RDMA over TCP, and have furthermore recognized the need to provide this capability over Ethernet fabrics. Therefore, the present invention described hereinbelow is provided to enable effective and efficient RDMA operations over a TCP/IP/Ethernet network.

Figure 2:
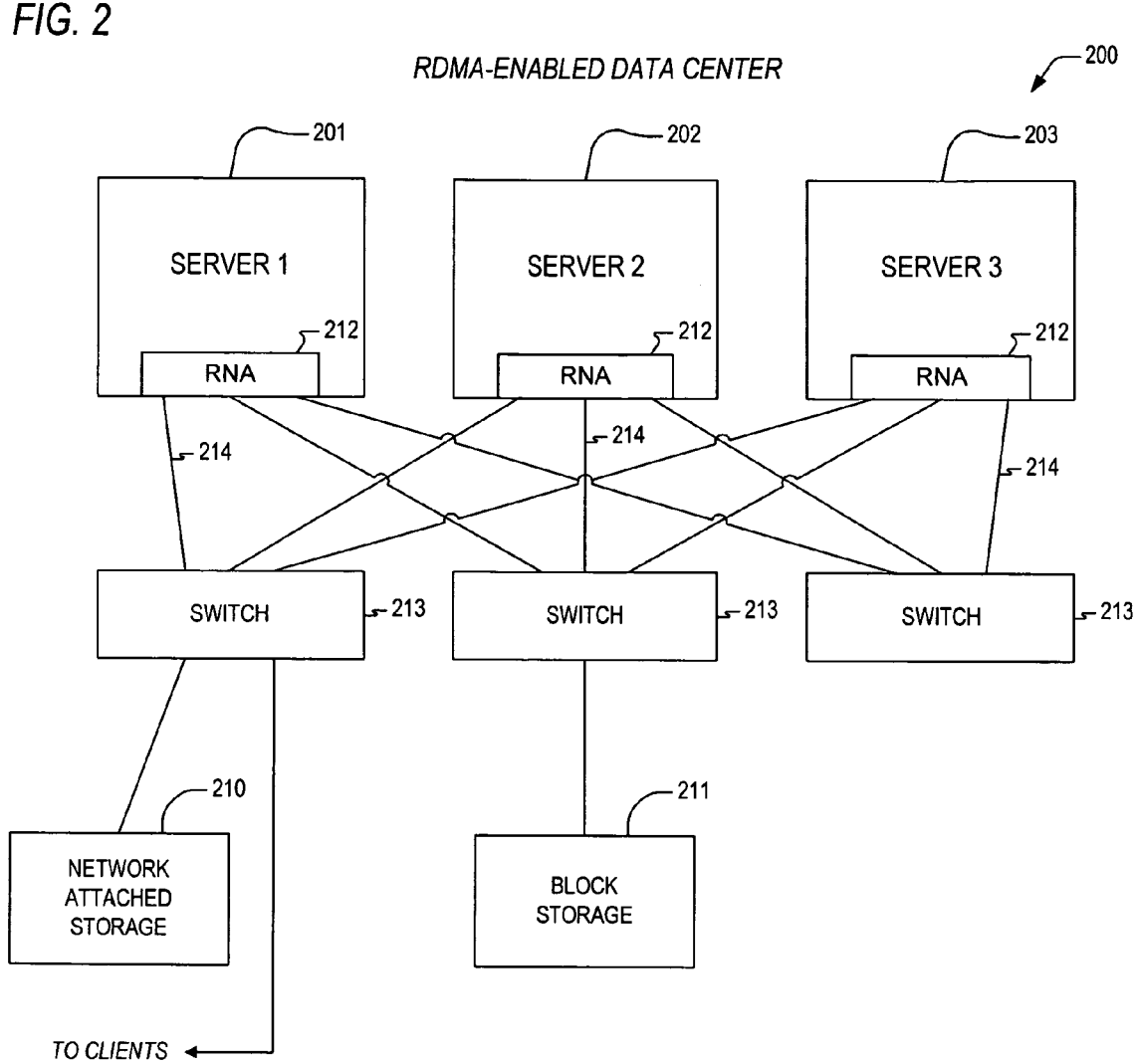
FIG. 2 is a block diagram featuring a data center according to the present invention that provides a LAN, SAN, and cluster over an RDMA-enabled TCP/IP Ethernet fabric.
Figure 3:
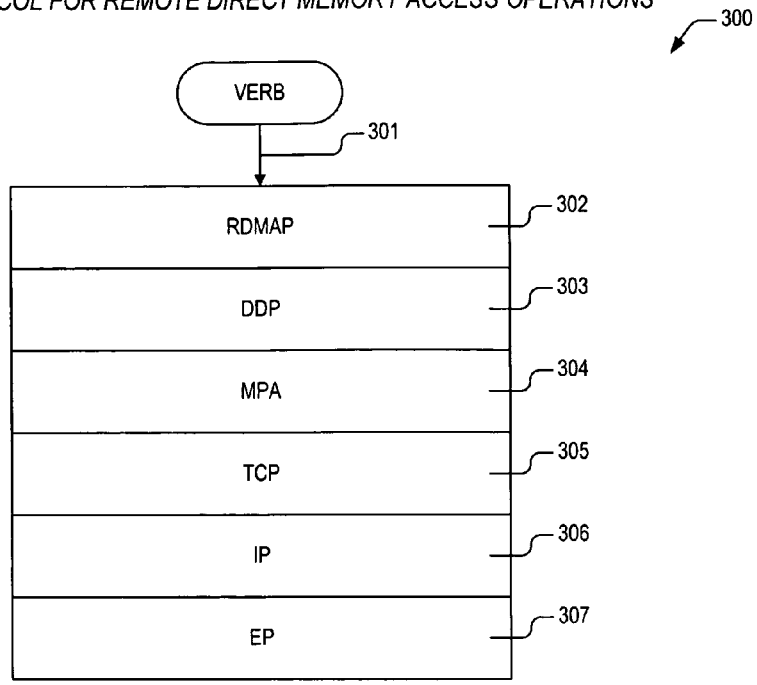
FIG. 3 is a block diagram showing a layered protocol for accomplishing remote direct memory access operations according to the present invention over a TCP/IP Ethernet fabric.

Now turning to FIG. 2, a block diagram featuring a multi-server configuration 200 within an exemplary data center according to the present invention that provides a LAN, SAN, and cluster over an RDMA-enabled TCP/IP Ethernet fabric that interconnects three servers 201-203 and that provides for a LAN, a SAN, and a cluster network. The servers 201-203 are interconnected over the LAN to clients and to network attached storage (NAS) 210 via a LAN fabric that consists of multiple point-to-point TCP/IP/Ethernet links 214 that are interconnected via one or more Ethernet switches 213 (or IP routers 213). The servers 201-203 each connect up to the LAN via an RDMA-enabled network adapter 212. Like the multi-server configuration 100 of FIG. 1, the configuration 200 of FIG. 2 utilizes TCP/IP over Ethernet as the LAN networking protocol. In one embodiment, the RDMA-enabled network adapter 212 is capable of accelerating a conventional TCP/IP stack and sockets connection by intercepting a conventional socket SEND command and performing RDMA operations to complete a requested data transfer. In an alternative embodiment, the RDMA-enabled network adapter 212 also supports communications via the conventional TCP/IP stack. The servers 201-203 are also interconnected over the SAN to one or more block storage devices 211 via a SAN fabric that consists of multiple point-to-point SAN links 214 that are interconnected via one or more Ethernet switches 213. In contrast to the configuration 100 of FIG. 1, the servers 201-203 each connect up to the SAN via the same RDMA-enabled network adapter 212 as is employed to connect up to the LAN. Rather than using Fibre Channel as the networking protocol, the SAN employs TCP/IP/Ethernet as the underlying networking protocol and may employ Internet SCSI (iSCSI) as an upper layer protocol (ULP) to enable transport of data to/from the block storage 211. In one embodiment, the RDMA-enabled network adapter 212 is capable of performing RDMA operations over a TCP/IP/Ethernet fabric responsive to iSCSI commands. The servers 201-203 are additionally interconnected over the cluster network to each other to allow for high performance computing applications as noted above. The cluster network consists of multiple point-to-point cluster links 214 that are interconnected via one or more Ethernet switches 213. The servers 201-203 each connect up to the cluster network via the same RDMA-enabled network adapter 212 as is used to connect to the LAN and SAN. For clustering applications, the verbs interface is used with the RDMA-enabled network adapter 212 over the TCP/IP/Ethernet fabric to enable low latency transfer of data over the clustering network.

Although a separate LAN, SAN, and cluster network are depicted in the RDMA-enabled multi-server configuration 200 according to the present invention, the present inventors also contemplate a single fabric over which LAN data, SAN data, and cluster network data are commingled and commonly switched. Various other embodiments are encompassed as well to include a commingled LAN and SAN, with a conventional cluster network that may employ separate switches (not shown) and cluster network adapters (not shown). In an embodiment that exhibits maximum commonality and lowest overall cost of ownership, data transactions for LAN, SAN, and cluster traffic are initiated via execution of RDMA over TCP verbs by application programs executing on the servers 201-203, and completion of the transactions are accomplished via the RDMA-enabled network adapters over the TCP/IP/Ethernet fabric. The present invention also contemplates embodiments that do not employ verbs to initiate data transfers, but which employ the RDMA-enabled adapter to complete the transfers across the TCP/IP/Ethernet fabric, via RDMA or other mechanisms Now turning to FIG. 3, a block diagram 300 is presented showing an exemplary layered protocol for accomplishing remote direct memory access operations according to the present invention over a TCP/IP Ethernet fabric. The exemplary layered protocol employs an verbs interface 301, an RDMA protocol layer 302, a direct data placement (DDP) layer 303, a marker PDU alignment layer 304, a conventional TCP layer 305, a conventional IP layer 306, and a conventional Ethernet layer 307.

In operation, a program executing on a server at either the user-level or kernel level initiates a data transfer operation by executing a verb as defined by a corresponding upper layer protocol (ULP). In one embodiment, the verbs interface 301 is defined by the aforementioned "RDMA Protocol Verbs Specification," provided by the RDMA Consortium, and which is hereinafter referred to as the Verbs Specification. The Verbs Specification refers to an application executing verbs as defined therein as a "consumer." The mechanism established for a consumer to request that a data transfer be performed by an RDMA-enabled network adapter according to the present invention is known as a queue pair (QP), consisting of a send queue and a receive queue. In addition, completion queue(s) may be associated with the send queue and receive queue. Queue pairs are typically areas of host memory that are setup, managed, and torn down by privileged resources (e.g., kernel thread) executing on a particular server, and the Verbs Specification describes numerous verbs which are beyond the scope of the present discussion that are employed by the privileged resources for management of queue pairs. Once a queue pair is established and assigned, a program operating at the user privilege level is allowed to bypass the operating system and request that data be sent and received by issuing a "work request" to a particular queue pair. The particular queue pair is associated with a corresponding queue pair that may be executing on a different server, or on the same server, and the RDMA-enabled network adapter accomplishes transfer of data specified by posted work requests via direct memory access (DMA) operations. In a typical embodiment, interface between memory control logic on a server and DMA engines in a corresponding RDMA-enabled network adapter according to the present invention is accomplished by issuing commands over a bus that supports DMA. In one embodiment, a PCI-X interface bus is employed to accomplish the DMA operations. In an alternative embodiment, interface is via a PCI Express bus.

Work requests are issued over the verbs interface 301 when a consumer executes verbs such as PostSQ (Post Work Request to Send Queue (SQ)) and PostRQ (Post Work Request to Receive Queue (RQ)). Each work request is assigned a work request ID which provides a means for tracking execution and completion. A PostSQ verb is executed to request data send, RDMA read, and RDMA write operations. A PostRQ verb is executed to specify a scatter/gather list that describes how received data is to be placed in host memory. In addition to the scatter/gather list, a PostRQ verb also specifies a handle that identifies a queue pair having a receive queue that corresponds to the specified scatter/gather list. A Poll for Completion verb is executed to poll a specified completion queue for indications of completion of previously specified work requests.

The issuance of a work request via the verbs interface by a consumer results in the creation of a work queue element (WQE) within a specified work queue (WQ) in host memory. Via an adapter driver and data stores, also in host memory, creation of the WQE is detected and the WQE is processed to effect a requested data transfer.

Once a SQ WQE is posted, a data transfer message is created by the network adapter at the RDMAP layer 302 that specifies, among other things, the type of requested data transfer (e.g. send, RDMA read request, RDMA read response, RDMA write) and message length, if applicable. WQEs posted to an RQ do not cause an immediate transfer of data. Rather, RQ WQEs are preposted buffers that are waiting for inbound traffic.

The DDP layer 303 lies between the RDMAP layer 302 and the MPA layer 304. Within the DDP layer 303, data from a ULP, that is a "DDP message," is segmented into a series of DDP segments, each containing a header and a payload. The size of the DDP segments is a function of the TCP MSS, which depends on the IP/link-layer Maximum Transmission Unit (MTU). The header at the DDP layer 303 specifies many things, the most important of which are fields which allow the direct placement into host memory of each DDP segment, regardless of the order in TCP sequence space of its arrival. There are two direct placement models supported, tagged and untagged. Tagged placement causes the DDP segment to be placed into a pre-negotiated buffer specified by an STag field (a sort of buffer handle) and TO field (offset into the buffer). Tagged placement is typically used with RDMA read and RDMA write messages. Untagged placement causes the DDP segment to be placed into a buffer that was not pre-negotiated, but instead was pre-posted by the receiving adapter onto one of several possible buffer queues. There are various fields in the DDP segment that allow the proper pre-posted buffer to be filled, including: a queue number that identifies a buffer queue at the receiver ("sink"), a message sequence number that uniquely identifies each untagged DDP message within the scope of its buffer queue number (i.e., it identifies which entry on the buffer queue this DDP segment belongs to), and a message offset that specifies where in the specified buffer queue entry to place this DDP segment. Note that the aforementioned queue number in the header at the DDP layer 303 does not correspond to the queue pair (QP) that identifies the connection. The DDP header also includes a field (i.e., the last flag) that explicitly defines the end of each DDP message.

The MPA layer 304 is a protocol that frames an upper level protocol data unit (PDU) to preserve its message record boundaries when transmitted over a reliable TCP stream. The MPA layer 304 produces framed PDUs (FPDUs). The MPA layer 304 creates an FPDU by pre-pending an MPA header, inserting MPA markers into the PDU at a 512 octet periodic interval in TCP sequence number space, post-pending a pad set to zeros to the PDU to make the size of the FPDU an integral multiple of four, and adding a 32-bit cyclic redundancy checksum (CRC) that is used to verify the contents of the FPDU. The MPA header is a 16-bit value that indicates the number of octets in the contained PDU. The MPA marker includes a 16-bit relative pointer that indicates the number of octets in the TCP stream from the beginning of the FPDU to the first octet of the MPA marker.

FPDUs are provided to the conventional TCP layer 305, which provides for reliable transmission of a stream of bytes over the established connection. This layer 305 divides FPDUs into TCP segments and prepends a TCP header which indicates source and destination TCP ports along with a TCP segment byte sequence number. In other words, the TCP segment byte sequence number is not a count of TCP segments; it is a count of bytes transferred.

TCP segments are passed to the IP layer 306. The IP layer 306 encapsulates the TCP segments into IP datagrams having a header that indicates source and destination IP addresses.

Finally, the IP datagrams are passed to the Ethernet layer 307, which encapsulates the IP datagrams into Ethernet frames, assigning a source and destination media access control (MAC) address to each, and post-pending a CRC to each frame.

One skilled in the art will appreciate that layers 305-307 represent conventional transmission of a stream of data over a reliable TCP/IP/Ethernet connection. Framing for preservation of ULPDU boundaries is provided for by the MPA layer 304. And direct placement of data via DMA is handled by an RDMA-enabled network adapter according to the present invention in accordance with verbs interface 301 and layers 302-303 as they interact with a consumer through an established work queue. It is noted that the information prepended and inserted by layers 302-304 is essential to determining when transmission of data associated with an RDMA operation (e.g., send, RDMA read, RDMA write) is complete. An RDMA-enabled network adapter that is employed in any practical implementation, to include LANs, SANs, and clusters that utilizes 10-Gb links must be capable of making such determination and must furthermore be capable of handling retransmission of TCP segments in the case of errors with minimum latency. One skilled in the art will appreciate that since the boundaries of an RDMA message are derived from parameters stored in a Work Queue in host memory, the host memory typically must be accessed in order to determine these boundaries. The present inventors recognize this unacceptable limitation of present day configurations and have provided, as will be described in more detail below, apparatus and methods for maintaining a local subset of the parameters provided in a work queue that are essential for retransmission in the event of network errors and for determining when a requested RDMA operation has been completed so that a completion queue entry can be posted in a corresponding completion queue.

Figure 4:
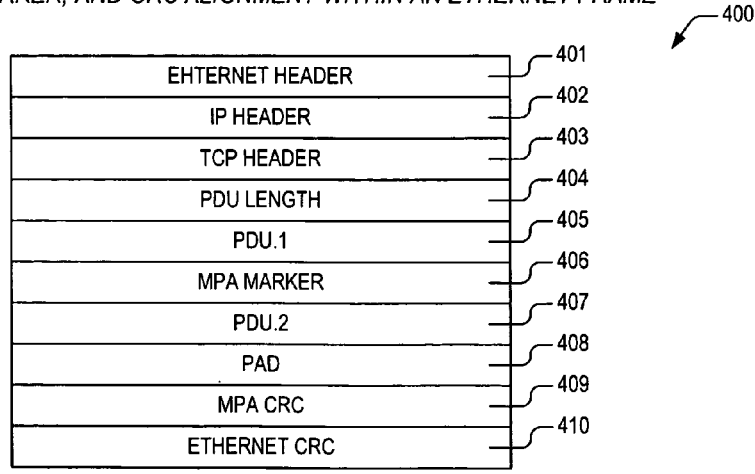
FIG. 4 is a block diagram depicting placement of an MPA header, MPA marker and MPA CRC within an Ethernet frame according to the present invention.

Now referring to FIG. 4, a block diagram is presented depicting placement of an MPA header 404, MPA marker 406, and MPA CRC 409 within an Ethernet frame 400 according to the present invention. As noted in the discussion above with reference to FIG. 3, the DDP layer 303 passes down a PDU to the MPA layer 304, where the PDU consists of a DDP header and DDP payload. The MPA layer 304 adds an MPA header 404 to the PDU indicating its length and is also required to insert an MPA marker 406 every 512 octets in the TCP sequence space that includes a 16-bit relative pointer that indicates the number of octets in the TCP stream from the beginning of the FPDU to the first octet of the MPA marker 406. Thus, the example of FIG. 4 shows an MPA marker 406 inserted within a single PDU, thus dividing the PDU into two parts: a first part PDU.1 405 prior to the marker 406, and a second part PDU.2 407 following the marker 406. In addition, the MPA layer 304 appends an MPA pad 408 and MPA CRC 409 as described above to form an FPDU comprising items 404-409. The TCP layer 305 adds a TCP header as described above to form a TCP segment comprising fields 403-409. The IP layer 306 adds an IP header 402 as described above to form an IP datagram comprising fields 402-409. And finally, the Ethernet layer adds an Ethernet header 401 and Ethernet CRC 410 to form an Ethernet frame comprising fields 401-410.

The present inventors note that the MPA marker 406 points some number of octets within a given TCP stream back to an octet which is designated as the beginning octet of an associated FPDU. If the maximum segment size (MSS) for transmission over the network is changed due to error or due to dynamic reconfiguration, and if an RDMA-enabled adapter is required to retransmit a portion of TCP segments using this changed MSS, the RDMA-enabled network adapter must rebuild or otherwise recreate all of the headers and markers within an FPDU so that they are in the exact same places in the TCP sequence space as they were in the original FPDU which was transmitted prior to reconfiguration of the network. This requires at least two pieces of information: the new changed MSS and the MSS in effect when the FPDU was first transmitted. An MSS change will cause the adapter to start creating never-transmitted segments using the new MSS. In addition, the adapter must rebuild previously transmitted PDUs if it is triggered to do so, for example, by. a transport timeout. In addition to parameters required to correctly recreate MPA FPDUs, one skilled in the art will appreciate that other parameters essential for rebuilding a PDU include the message sequence number (e.g., Send MSN and/or Read MSN) assigned by the DDP layer 303, the starting TCP sequence number for the PDU, and the final TCP sequence number for the PDU. Most conventional schemes for performing retransmission maintain a retransmission queue which contains parameters associated with PDUs that have been transmitted by a TCP/IP stack, but which have not been acknowledged. The queue is typically embodied as a linked list and when retransmission is required, the linked list must be scanned to determine what portion of the PDUs are to be retransmitted. A typical linked list is very long and consists of many entries. This is because each of the entries corresponds to an Ethernet packet. Furthermore, the linked list must be scanned in order to process acknowledged TCP segments for purposes of generating completion queue entries. In addition, for RDMA over TCP operations, the specifications require that completion queue entries be developed on a message basis. And because TCP is a streaming protocol, the data that is required to determine message completions must be obtained from the upper layers 301-304. The present inventors have noted that such an implementation is disadvantageous as Ethernet speeds are approaching 10 Gb/second because of the latencies associated with either accessing a work queue element in host memory over a PCI bus or because of the latencies associated with scanning a very long linked list. In contrast, the present invention provides a superior technique for tracking information for processing of retransmissions and completions at the message level (as opposed to packet-level), thereby eliminating the latencies associated with scanning very long linked lists.

Figure 5:
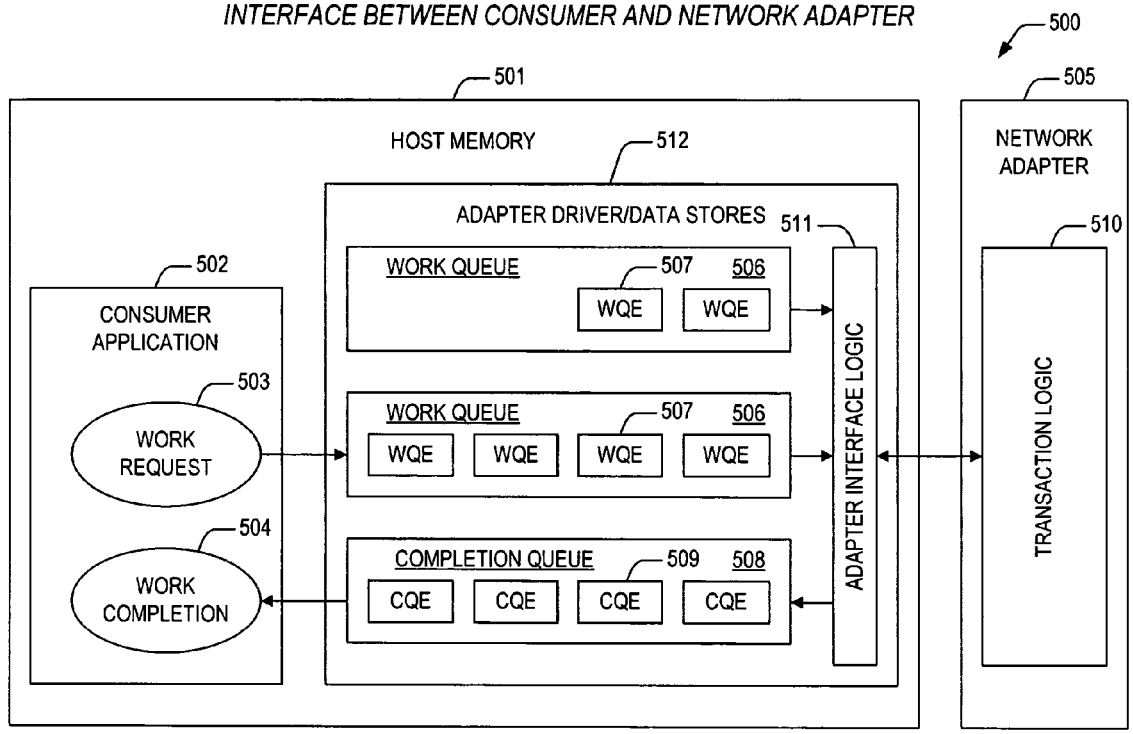
FIG. 5 is a block diagram illustrating the interface between a consumer application in host memory and a network adapter according to the present invention.

To further illustrate features and advantages of the present invention, attention is now directed to FIG. 5, which is a block diagram 500 illustrating interface between a consumer application 502 in host memory 501 and an RDMA-enabled network adapter 505 according to the present invention. The block diagram 500 illustrates the employment of work queues 506 according to the present invention disposed within adapter driver/data stores 512 to support RDMA over TCP operations. The adapter driver/data stores 512 is disposed within the host memory 501 and maintains the work queues 506 and provides for communication with the network adapter 505 via adapter interface logic 511. A work queue 506 is either a send queue or a receive queue. As alluded to above in the discussion with reference to FIG. 3, a work queue 506 is the mechanism through which a consumer application 502 provides instructions that cause data to be transferred between the application's memory and another application's memory. The diagram 500 depicts a consumer 502 within host memory 501. A consumer 502 may have one or more corresponding work queues 506, with a corresponding completion queue 508. Completion queues 508 may be shared between work queues 506. For clarity, the diagram 500 depicts only the send queue (SQ) portion 506 of a work queue pair that consists of both a send queue 506 and a receive queue (not shown). The completion queue 508 is the mechanism through which a consumer 502 receives confirmation that the requested RDMA over TCP operations have been accomplished. Transaction logic 510 within the network adapter 510 is coupled to each of the work queues 506 and the completion queue 508 via the adapter driver logic 511.

The present inventors note that the network adapter 505 according to the present invention can be embodied as a plug-in module, one or more integrated circuits disposed on a blade server, or as circuits within a memory hub/controller. It is further noted that the present invention comprehends a network adapter 505 having work queues 506 disposed in host memory 501 and having transaction logic 510 coupled to the host memory 501 via a host interface such as PCI-X or PCI-Express. It is moreover noted that the present invention comprehends a network adapter 505 comprising numerous work queue pairs. In one embodiment, the network adapter 505 comprises a maximum of 256 K work queue pairs.

RDMA over TCP operations are invoked by a consumer 502 through the generation of a work request 503. The consumer 502 receives confirmation that an RDMA over TCP operation has been completed by receipt of a work completion 504. Work requests 503 and work completions 504 are generated and received via the execution of verbs as described in the above noted Verb Specification. Verbs are analogous to socket calls that are executed in a TCP/IP-based architecture. To direct the transfer of data from consumer memory 501, the consumer 502 executes a work request verb that causes a work request 503 to be provided to the adapter driver/data stores 512. The adapter driver/data stores 512 receives the work request 503 and places a corresponding work queue element 507 within the work queue 506 that is designated by the work request 503. The adapter interface logic 511 communicates with the network adapter 505 to cause the requested work to be initiated. The transaction logic 510 executes work queue elements 507 in the order that they are provided to a work queue 506 resulting in transactions over the TCP/IP/Ethernet fabric (not shown) to accomplish the requested operations. As operations are completed, the transaction logic 510 places completion queue elements 509 on completion queues 508 that correspond to the completed operations. The completion queue elements 509 are thus provided to corresponding consumers 502 in the form of a work completion 504 through the verbs interface. It is furthermore noted that a work completion 504 can only be generated after TCP acknowledgement of the last byte within TCP sequence space corresponding to the given RDMA operation has been received by the network adapter 505.

FIG. 5 provides a high-level representation of queue structures 506, 508 corresponding to the present invention to illustrate how RDMA over TCP operations are performed from the point of view of a consumer application 502. At a more detailed level, FIG. 6 is presented to highlight how operations occur at selected layers noted in FIG. 3 to accomplish movement of data according to the present invention between two servers over a TCP/IP Ethernet network.

Figure 6:
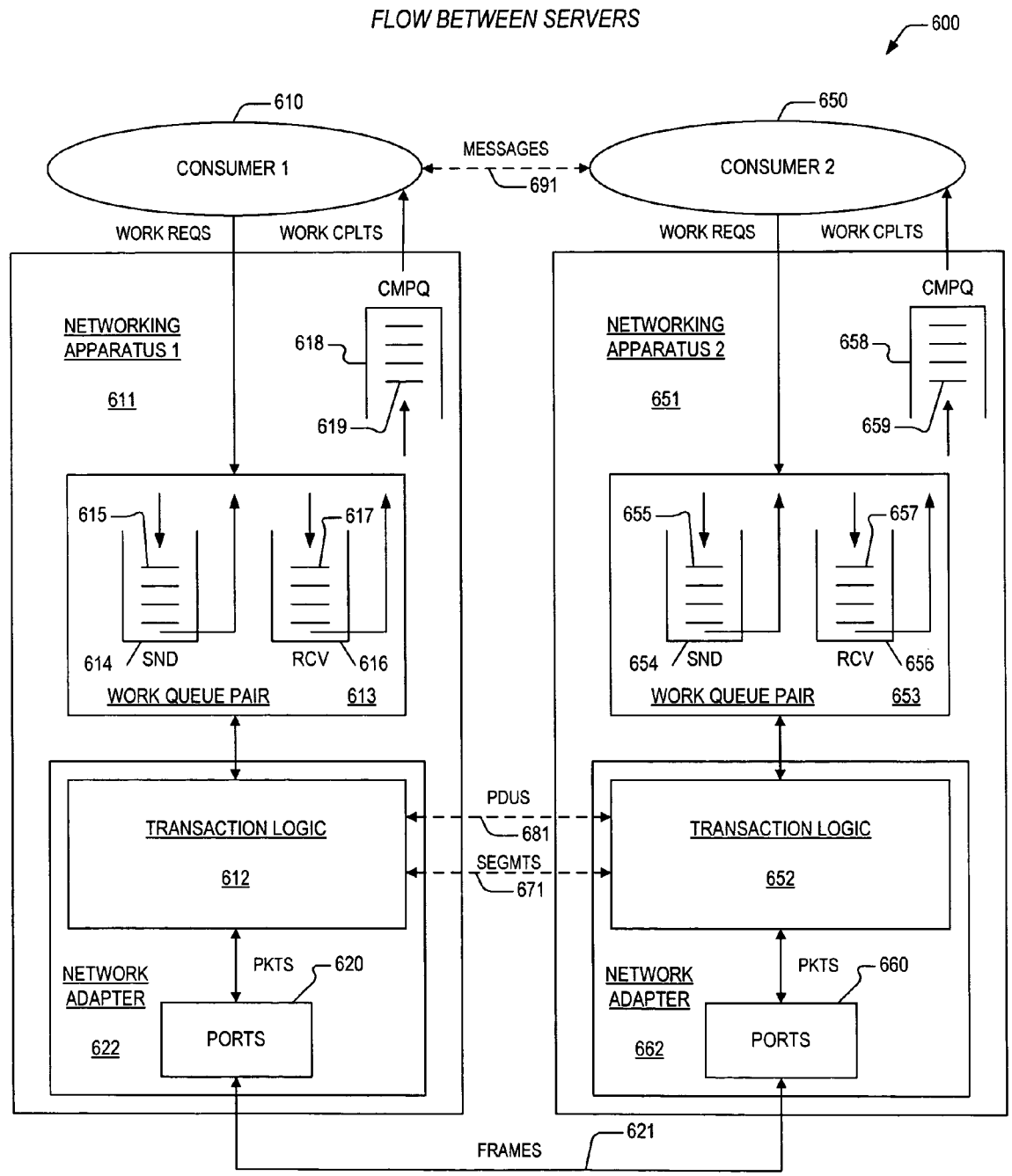
FIG. 6 is a block diagram highlighting how operations occur at selected layers noted in FIG. 3 to accomplish movement of data according to the present invention between two servers over a TCP/IP Ethernet network.

Turning to FIG. 6, a block diagram 600 is presented showing two consumers 610, 650 communicating over an RDMA-enabled TCP/IP/Ethernet interface. The diagram 600 shows a first consumer application 610 coupled to a first networking apparatus 611 within a first server according to the present invention that is interfaced over an RDMA-enabled TCP/IP/Ethernet fabric to a counterpart second consumer application 650 coupled to a second networking apparatus 651 within a second server according to the present invention. The first consumer 610 issues work requests and receives work completions to/from the first networking apparatus 611. The second consumer 650 issues work requests and receives work completions to/from the second networking apparatus 651. For the accomplishment of RDMA over TCP operations between the two consumers 610, 650, each of the networking apparatuses 611, 651 have established a corresponding set of work queue pairs 613, 653 through which work queue elements 615, 617, 655, 657 will be generated to transfer data to/from first host memory in the first server from/to second host memory in the second server in the form of RDMA messages 691. Each of the work queue pairs 613, 653 has a send queue 614, 654 and a receive queue 616, 656. The send queues 614, 654 contain send queue elements 615, 655 that direct RDMA over TCP operations to be transacted with the corresponding work queue pair 653, 613. The receive queues 616, 656 contain receive queue elements 617, 657 that specify memory locations (e.g., scatter/gather lists) to which data received from a corresponding consumer 610, 650 is stored. Each of the networking apparatuses 611, 651 provide work completions to their respective consumers 610, 650 via one or more completion queues 618, 658. The work completions are provided as completion queue elements 619, 659. Each of the work queue pairs 613, 653 within the networking apparatuses 611, 651 are interfaced to respective transaction logic 612, 652 within an RDMA-enabled network adapter 622, 662 according to the present invention. The transaction logic 612, 652 processes the work queue elements 615, 617, 655, 657. For send queue work queue elements 615, 655 that direct transmission of PDUs 681, the transaction logic 612, 652 generates PDUs 681, lower level FPDUs (not shown), TCP segments 671, IP datagrams (not shown), and Ethernet frames (not shown) and provides the frames to a corresponding Ethernet port 620, 660 on the network adapter 622, 662. The ports 620, 660 transmit the frames over a corresponding Ethernet link 621. It is noted that any number of switches (not shown), routers (not shown), and Ethernet links 621 may be embodied as shown by the single Ethernet link 621 to accomplish routing of packets in accordance with the timing and latency requirements of the given network.

In an architectural sense, FIG. 6 depicts how all layers of an RDMA over TCP operation according to the present invention are provided for by RDMA-aware consumers 610, 650 and networking apparatus 611, 651 according to the present invention. This is in stark contrast to a convention TCP/IP stack that relies exclusively on the processing resources of a server's CPU. Ethernet frames are transmitted over Ethernet links 621. Data link layer processing is accomplished via ports 620, 660 within the network adapters 622, 662. Transaction logic 612, 652 ensures that IP packets are routed (i.e., network layer) to their proper destination node and that TCP segments 671 are reliably delivered. In addition, the transaction logic 612, 652 ensures end-to-end reliable delivery of PDUs 681 and the consumers 610, 650 are notified of successful delivery through the employment of associated completion queues 618, 658. Operations directed in corresponding work queues 613, 653 result in data being moved to/from the host memories of the consumer applications 610, 650 connected via their corresponding queue pairs 613, 653.

Figure 7:
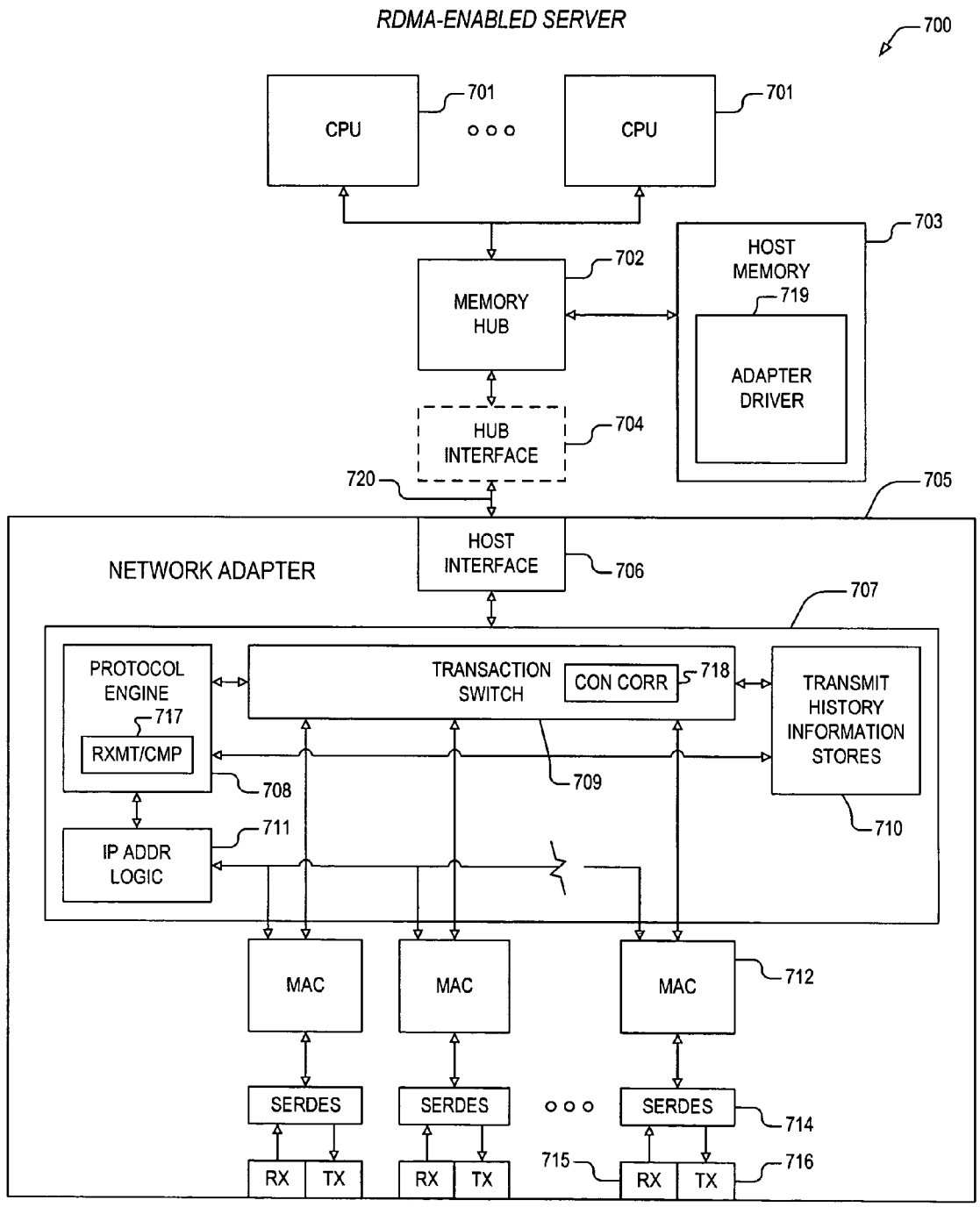
FIG. 7 is a block diagram of an RDMA-enabled server according to the present invention.

Referring to FIG. 7, a block diagram is presented of an RDMA-enabled server 700 according to the present invention. The server 700 has one or more CPUs 701 that are coupled to a memory hub 702. The memory hub 702 couples CPUs and direct memory access (DMA)-capable devices to host memory 703 (also known as system memory 703). An RDMA-enabled network adapter driver 719 is disposed within the host memory. The driver 719 provides for control of and interface to an RDMA-enabled network adapter 705 according to the present invention. The memory hub 702 is also referred to as a memory controller 702 or chipset 702. Commands/responses are provided to/from the memory hub 702 via a host interface 720, including commands to control/manage the network adapter 705 and DMA commands/responses. In one embodiment, the host interface 720 is a PCI-X bus 720. In an alternative embodiment, the host interface 720 is a PCI Express link 720. Other types of host interfaces 720 are contemplated as well, provided they allow for rapid transfer of data to/from host memory 703. An optional hub interface 704 is depicted and it is noted that the present invention contemplates that such an interface 704 may be integrated into the memory hub 702 itself, and that the hub interface 704 and memory hub 702 may be integrated into one or more of the CPUs 701.

The network adapter 705 has host interface logic 706 that provides for communication to the memory hub 702 and to the driver 719 according to the protocol of the host interface 720. The network adapter 705 also has transaction logic 707 that communicates with the memory hub 702 and driver 719 via the host interface logic. The transaction logic 707 is also coupled to one or more media access controllers (MAC) 712. In one embodiment, there are four MACs 712. In one embodiment, each of the MACs 712 is coupled to a serializer/deserializer (SERDES) 714, and each of the SERDES 714 are coupled to a port that comprises respective receive (RX) port 715 and respective transmit (TX) port 716. Alternative embodiments contemplate a network adapter 705 that does not include integrated SERDES 714 and ports. In one embodiment, each of the ports provides for communication of frames in accordance with 1 Gb/sec Ethernet standards. In an alternative embodiment, each of the ports provides for communication of frames in accordance with 10 Gb/sec Ethernet standards. In a further embodiment, one or more of the ports provides for communication of frames in accordance with 10 Gb/sec Ethernet standards, while the remaining ports provide for communication of frames in accordance with 1 Gb/sec Ethernet standards. Other protocols for transmission of frames are contemplated as well, to include Asynchronous Transfer Mode (ATM).

The transaction logic 707 includes a transaction switch 709 that is coupled to a protocol engine 708, to transmit history information stores 710, and to each of the MACs 712. The protocol engine includes retransmit/completion logic 717. The protocol engine is additionally coupled to IP address logic 711 and to the transmit history information stores 710. The IP address logic 711 is coupled also to each of the MACs 712. In addition, the transaction switch 709 includes connection correlation logic 718.

In operation, when a CPU 701 executes a verb as described herein to initiate a data transfer from the host memory 703 in the server 700 to second host memory (not shown) in a second device (not shown), the driver 719 is called to accomplish the data transfer. As alluded to above, it is assumed that privileged resources (not shown) have heretofore set up and allocated a work queue within the host memory 703 for the noted connection. Thus execution of the verb specifies the assigned work queue and furthermore provides a work request for transfer of the data that is entered as a work queue element into the assigned work queue as has been described with reference to FIGS. 5-6. Establishment of the work queue entry into the work queue triggers the driver 719 to direct the network adapter 705 via the host interface 720 to perform the requested data transfer. Information specified by the work queue element to include a work request ID, a steering tag (if applicable), a scatter/gather list (if applicable), and an operation type (e.g., send, RDMA read, RDMA write), along with the work queue number, are provided over the host interface 720 to the transaction logic 707. The above noted parameters are provided to the protocol engine 708, which schedules for execution the operations required to effect the data transfer through a transmit pipeline (not shown) therein. The protocol engine 708 schedules the work required to effect the data transfer, and in addition fills out an entry (not shown) in a corresponding transmit FIFO buffer (not shown) that is part of the transmit history information stores 710. The corresponding FIFO buffer is dynamically bound to the work queue which requested the data transfer and every bound FIFO buffer provides entries corresponding one-to-one with the entries in the work queue to which it is dynamically bound. In one embodiment, the transmit FIFO buffer is embodied as a memory that is local to the network adapter 705. Dynamic binding of FIFO buffers to work queues according to the present invention is extremely advantageous from the standpoint of efficient utilization of resources. For example, consider an embodiment comprising a 16 KB FIFO buffer. In a configuration that supports, say, 4 K queue pairs, if dynamic binding were not present, then 64 MB of space would be required to provide for all of the queue pairs. But, as one skilled in the art will appreciate, it is not probable that all queue pairs will be transmitting simultaneously, so that a considerable reduction in logic is enabled by implementing dynamic binding. Upon allocation of the entry in the transmit FIFO buffer, parameters from the work queue element are copied thereto and maintained to provide for effective determination of completion of the data transfer and for rebuilding/retransmission of TCP segments in the event of network errors or dynamic reconfiguration. These parameters include, but are not limited to: the work request ID and the steering tag. To effect the data transfer, the data specified in the work queue element is fetched to the network adapter 705 using DMA operations to host memory 703 via the host interface 720 to the memory controller 702. The data is provided to the transaction switch 709. The protocol engine 708 in conjunction with the transaction switch 709 generates all of the header, marker, and checksum fields described hereinabove for respective layers of the RDMA over TCP protocol and when PDUs, FPDUs, TCP segments, and IP datagrams are generated, parameters that are essential to a timely rebuild of the PDUs (e.g., MULPDU, the message sequence number, the starting and final TCP sequence numbers) are provided to the transmit history information stores 710 in the allocated entry in the transmit FIFO buffer. In one embodiment, the connection correlation logic 718 within the transaction switch 709, for outgoing transmissions, provides an association (or "mapping") for a work queue number to a "quad." The quad includes TCP/IP routing parameters that include a source TCP port, destination TCP port, a source IP address, and a destination IP address. Each queue pair has an associated connection context that directly defines all four of the above noted parameters to be used in outgoing packet transmissions. These routing parameters are employed to generate respective TCP and IP headers for transmission over the Ethernet fabric. In an alternative embodiment, the connection correlation logic 718, for outgoing transmissions, is disposed within the protocol engine 708 and employs IP addresses stored within the IP address logic 711. The Ethernet frames are provided by the transaction switch 709 to a selected MAC 712 for transmission over the Ethernet fabric. The configured Ethernet frames are provided to the SERDES 714 corresponding to the selected MAC 712. The SERDES 714 converts the Ethernet frames into physical symbols that are sent out to the link through the TX port 716. For inbound packets, the connection correlation logic 718 is disposed within the transaction switch 709 and provides a mapping of an inbound quad to a work queue number, which identifies the queue pair that is associated with the inbound data.

The IP address logic 711 contains a plurality of entries that are used as source IP addresses in transmitted messages, as alluded to above. In one embodiment, there are 32 entries. In addition, when an inbound datagram is received correctly through one of the MACs 712, the destination IP address of the datagram is compared to entries in the IP address logic 711. Only those destination IP addresses that match an entry in the IP address logic 711 are allowed to proceed further in the processing pipeline associated with RDMA-accelerated connections. As noted above, other embodiments of the present invention are contemplated that include use of an RDMA-enabled network adapter 705 to also process TCP/IP transactions using a conventional TCP/IP network stack in host memory. According to these embodiments, if an inbound packet's destination IP address does not match an entry in the IP address logic 711, then the packet is processed and delivered to the host according to the associated network protocol.

The protocol engine 708 includes retransmit/completion logic 717 that monitors acknowledgement of TCP segments which have been transmitted over the Ethernet fabric. If network errors occur which require that one or more segments be retransmitted, then the retransmit/completion logic 717 accesses the entry or entries in the corresponding transmit FIFO buffer to obtain the parameters that are required to rebuild and retransmit the TCP segments. The retransmitted TCP segments may consist of a partial FPDU under conditions where maximum segment size has been dynamically changed. It is noted that all of the parameters that are required to rebuild TCP segments associated for retransmission are stored in the associated transmit FIFO buffer entries in the transmit history information stores 710.

Furthermore, a final TCP sequence number for each generated message is stored in the entry so that when the final TCP sequence number has been acknowledged, then the protocol engine 708 will write a completion queue entry (if required) to a completion queue in host memory 703 that corresponds to the work queue element that directed the data transfer.

It is also noted that certain applications executing within the same server 700 may employ RDMA over TCP operations to transfer data. As such, the present invention also contemplates mechanisms whereby loopback within the transaction logic 707 is provided for along with corresponding completion acknowledgement via the parameters stored by the transmit history information stores 710.

Figure 8:
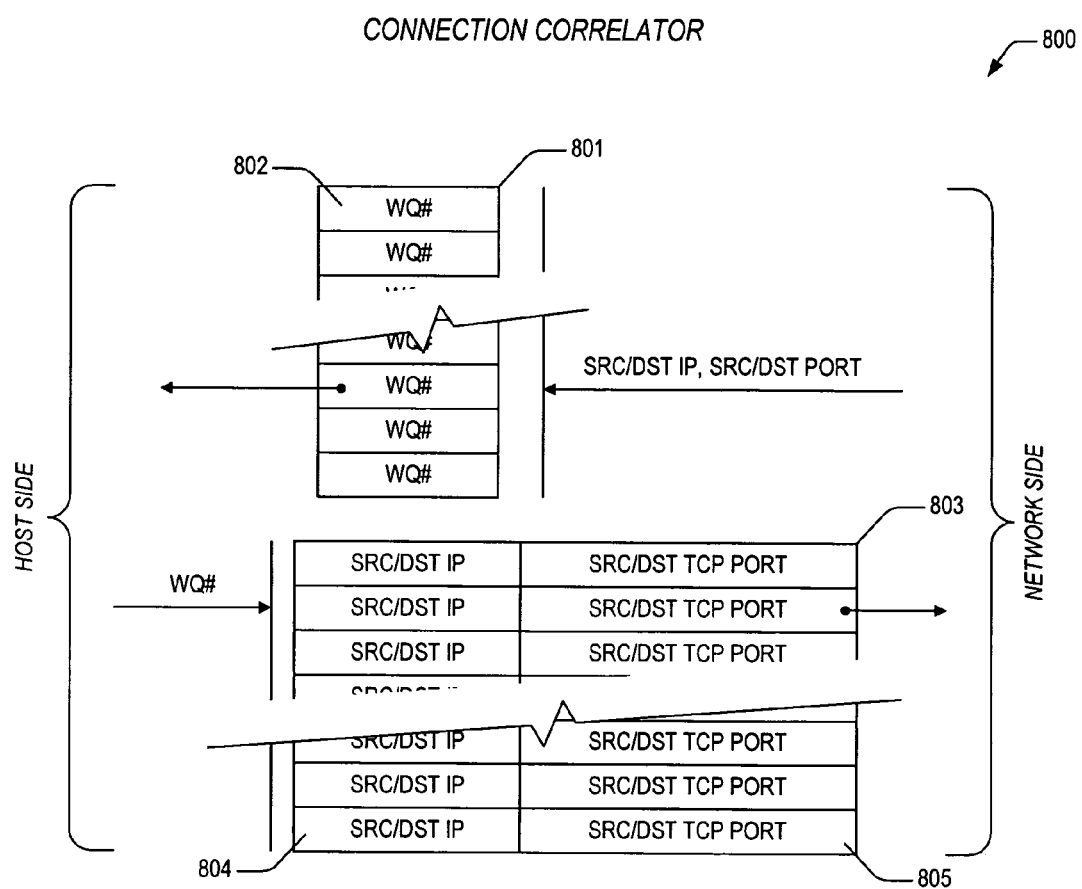
FIG. 8 is a block diagram featuring a connection correlator within the RDMA-enabled server of FIG. 7.

Now turning to FIG. 8, a block diagram is presented featuring an exemplary connection correlator 800 within the RDMA-enabled server 700 of FIG. 7. The block diagram shows a work queue-to-TCP map 803 and a TCP-to-work queue map 801. The TCP-to-work queue map 801 has one or more entries 802 that associate a "quad" retrieved from inbound IP datagrams with a corresponding work queue number. A quad consists of source and destination IP addresses and source and destination TCP ports. Thus, correlation between a quad and a work queue number, establishes a virtual connection between two RDMA-enabled devices. Thus, the payloads of received datagrams are mapped for processing and eventual transfer to an associated area of memory that is specified by a work queue element within the selected work queue number 802.

For outbound datagrams, the work queue-to-TCP map 803 has one or more entries 804, 805 that associate a work queue number with a corresponding quad that is to be employed when configuring the outbound datagrams. Accordingly, the outbound datagrams for associated FPDUs of a given work queue number are constructed using the selected quad.

The exemplary connection correlator 800 of FIG. 8 is provided to clearly teach correlation aspects of the present invention, and the present inventors note that implementation of the correlator 800 as a simple indexed table in memory as shown is quite impractical. Rather, in one embodiment, the TCP-to-work queue map 801 is disposed within a hashed, indexed, and linked list structure that is substantially similar in function to content addressable memory.

Referring to FIG. 9, a block diagram is presented showing details of transmit history information stores 900 within a network adapter according to the present invention. The transmit history information stores 900 includes entry access logic 902 that is coupled to a plurality of transmit FIFO buffers 903. Each of the buffers 903 includes one or more entries 904 which are filled out by a protocol engine according to the present invention while processing work queue elements requiring transmission of data over the Ethernet fabric. In one embodiment, the transmit history information stores 900 is a memory that is integrated within a network adapter according to the present invention. In an alternative embodiment, the transmit history information stores 900 is a memory that is accessed over a local memory bus (not shown). In this alternative embodiment, optional interface logic 901 provides for coupling of the entry access logic 902 to the local memory bus. In one embodiment, each buffer 903 comprises 16 Kilobytes which are dynamically bound to a queue pair when send queue elements exist on that pair for which there are to-be-transmitted or unacknowledged TCP segments. Each buffer 903 is temporarily bound to a queue pair as previously noted and each entry 904 is affiliated with a work queue element on the queue pair's send queue. In one embodiment, each buffer entry 904 comprises 32 bytes.

Now turning to FIG. 10, a block diagram is presented providing details of an exemplary transmit FIFO buffer entry 1000 according to the present invention. The buffer entry includes the following fields: sendmsn 1001, readmsn 1002, startseqnum 1003, finalseqnum 1004, streammode 1005, sackpres 1006, mulpdu 1007, notifyoncomp 1008, stagtoinval 1009, workreqidlw 1010, workreqidhi 1011, and type 1012. The sendmsn field 1001 maintains the current 32-bit send message sequence number. The readmsn field 1002 maintains the current 32-bit read message sequence number. The startseqnum field 1003 maintains the initial TCP sequence number of the send queue element affiliated with the entry 1000 The startseqnum field 1003 is provided to the entry 1000 during creation of the first TCP segment of the message. The finalseqnum field 1004 maintains the final TCP sequence number of the message. The finalseqnum field 1004 is provided during creation of the of the first TCP segment of the message. The streammode field 1005 maintains a 1-bit indication that TCP streaming mode is being employed to perform data transactions other than RDMA over TCP, for example, a TCP-offload operation. The sackpres field 1006 maintains a 1-bit indication that the mulpdu field 1007 has been reduced by allocation for a maximum sized SACK block. The mulpdu field 1007 maintains a size of the maximum upper level PDU that was in effect at the time of transmit. This field 1007 is used when TCP segments are being rebuilt in the event of network errors to re-segment FPDUs so that they can be reliably received by a counterpart network adapter. The notifyoncomp field 1008 indicates whether a completion queue element needs to be generated by the network adapter for the associated work queue element when all outstanding TCP segments of the message have been acknowledged. The stagtoinval field 1009 maintains a 32-bit steering tag associated with an RDMA Read Request with Local Invalidate option. The workreqidlow field 1010 and workreqidhi field 1011 together maintain the work request ID provided by the work queue element on the corresponding send queue. These fields 1010-1011 are used to post a completion queue event. The type field 1012 is maintained to identify the type of operation that is being requested by the send queue element including send, RDMA read, and RDMA write.

Although the present invention and its objects, features, and advantages have been described in detail, other embodiments are contemplated by the present invention as well. For example, the present invention has been particularly characterized in terms of a verbs interface as characterized by specifications provided by the RDMA Consortium. And while the present inventors consider that these specifications will be adopted by the community at large, it is noted that the present invention contemplates other protocols for performing RDMA operations over TCP/IP that include the capability to offload TCP/IP-related processing from a particular CPU. As such, retransmit/completion mechanisms according to the present invention may be applied where, say, iSCSI, is employed as an upper layer protocol rather than the RDMA over TCP verbs interface. Another such application of the present invention is acceleration of a conventional TCP/IP connection through interception of a sock send request by an application that is not RDMA-aware.

Furthermore, the present invention has been described as providing for RDMA over TCP/IP connections over an Ethernet fabric. This is because Ethernet is a widely known and used networking fabric and because it is anticipated that the community's investment in Ethernet technologies will drive RDMA over TCP applications to employ Ethernet as the underlying network fabric. But the present inventors note that employment of Ethernet is not essential to practice of the present invention. Any network fabric that provides for data link and physical layer transmission of data is suitable as a substitute for the Ethernet frames described herein.

Moreover, the present invention has been characterized in terms of a host interface that is embodied as PCI-X or PCI Express. Such interconnects today provide for communication between elements on the interconnect and a memory controller for the purpose of performing DMA transfers. But the medium of PCI is employed only to teach the present invention. Other mechanisms for communication of DMA operations are contemplated. In fact, in an embodiment where an RDMA-enabled network adapter according to the present invention is entirely integrated into a memory controller, a proprietary bus protocol may allow for communication of DMA transfers with memory controller logic disposed therein as well, in complete absence of any PCI-type of interface.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, for performing remote direct memory access (RDMA) operations between a first server and a second server over an Ethernet fabric, the RDMA operations being initiated by execution of a verb according to a remote direct memory access protocol, the verb being executed by a central processing unit (CPU) on the first server, the apparatus comprising:

a network adapter in the first server, the network adapter including transaction logic, the transaction logic being to process a work queue element corresponding to the verb, and also being to accomplish the RDMA operations over a Transmission Control Protocol/Internet Protocol (TCP/IP) interface between the first and second servers, wherein said work queue element resides within first host memory in the first server, the first host memory being coupled to the CPU via a memory controller, the network adapter being coupled to the first host memory via both a host interface that is comprised in the network adapter and the memory controller, the first host memory to store an adapter driver to provide control of the network adapter, said transaction logic comprising:

transmit history information stores, to maintain a local copy of a subset of parameters in said work queue element, the transmit history information stores including additional parameters in addition to the parameters in the work queue element, the transmit history stores being in a local memory that is comprised in the network adapter, the local memory being separate and distinct from the first host memory within which resides the work queue element, the transmit history information stores being to store the local copy and the additional parameters in one or more entries in one or more first-in-first-out (FIFO) buffers in the transmit history information stores, the one or more FIFO buffers being dynamically bound to the work queue element residing within the first host memory; and a protocol engine, coupled to said transmit history information stores, to access said local copy of the subset of the parameters and the additional parameters, the subset being selected so as to enable the protocol engine to rebuild, based on the local copy, for retransmission one or more TCP segments corresponding to the RDMA operations in event of network transmission error, the subset also being selected so as to enable the protocol engine to determine, based on the local copy, if the RDMA operations have been completed;

the transaction logic in the network adapter also comprising IP address logic coupled both to a medium access controller (MAC) of the network adapter and to the protocol engine, the IP address logic to contain IP address entries to be used as source IP addresses in transmitted messages, the network adapter to compare with the IP address entries a destination IP address of an inbound datagram received by the MAC, the network adapter to process the inbound datagram in accordance with a RDMA connection processing pipeline only if the destination IP address matches one of the IP address entries, the network adapter to process the inbound datagram using a TCP/IP stack if no match to the destination IP address is in the IP address entries, the transaction logic including connection correlation logic to provide, for an outgoing transmission, mapping of a work queue number to TCP/IP routing parameters, the TCP/IP routing parameters including source and destination TCP ports and source and destination IP addresses, the one or more entries in the one or more FIFO buffers in the transmit history information stores including a plurality of such entries, each respective one of the plurality of such entries including a respective field set and corresponding with a respective corresponding one of entries in the work queue element, each respective field set including a respective sendmsn field, a respective readmsn field, a respective first flag field, a respective startseqnum field, a respective finalseqnum field, a respective sackpres field, a respective notifyoncomp field, and a respective maximum upper level protocol data unit (MULPDU) field, the respective sendmsn field maintaining a current send message sequence number, the respective readmsn field maintaining a current read message sequence number, the respective startseqnum field maintaining an initial TCP sequence number of the respective one of the entries in the work queue elements, the finalseqnum field maintaining a final TCP sequence number of a message corresponding to the respective one of the entries in the work queue elements, the startseqnum field and the finalseqnum field being provided to the respective one of the plurality of entries in the one or more FIFO buffers in the transmit history information stores during creation of a first TCP segment of the message, the respective first flag field indicating whether a TCP streaming mode, other than RDMA over TCP, is being employed to perform a TCP-offload related data transaction associated with the respective corresponding one of the entries in the work queue element, the respective MULPDU field being to record a size of a MULPDU, associated with the respective corresponding one of the entries in the work queue element, that was in effect at a previous transmission time of the MULPDU, the size recorded in the MULPDU field to be used to re-segment one or more framed protocol data units (FPDU) and to rebuild one or more TCP segments that were transmitted during the previous transmission time in event of either of the following limitations numbered (1) and (2): (1) a network error associated with the one or more TCP segments, and (2) dynamic changing of the size of the MULPDU, the one or more TCP segments that are rebuilt consisting of a partial FPDU if the size of the MULPDU has been dynamically changed, the respective sackpres field being to indicate whether the respective MULPDU field has been reduced by allocation for a maximum sized SACK block, the respective notifyoncomp field being to indicate whether completion queue element generation is to occur for the adapter after outstanding TCP message segment acknowledgement.

2. The apparatus as recited in claim 1, wherein said transaction logic causes data corresponding to the RDMA operations to be transferred from second host memory into said first host memory, wherein said second host memory corresponds to the second server.

3. The apparatus as recited in claim 1, wherein said transaction logic causes data corresponding to the RDMA operations to be transferred from said first host memory into second host memory, wherein said second host memory corresponds to the second server.

4. The apparatus as recited in claim 1, wherein said protocol engine employs said parameters to generate a completion queue element that corresponds to said work queue element.

5. The apparatus as recited in claim 1, wherein said Ethernet fabric comprises a point-to-point fabric, and the apparatus is capable of performing the RDMA operations over the point-to-point fabric.

6. The apparatus as recited in claim 1, wherein said Ethernet fabric comprises one or more 1-Gigabit Ethernet links, and the apparatus is capable of performing the RDMA operations over the one or more 1-Gigabit Ethernet links.

7. The apparatus as recited in claim 1, wherein said Ethernet fabric comprises one or more 10-Gigabit Ethernet links, and the apparatus is capable of performing the RDMA operations over the one or more 10-Gigabit Ethernet links.

8. The apparatus as recited in claim 1, wherein said network adapter comprises a printed circuit board.

9. The apparatus as recited in claim 1, wherein said network adapter comprises an integrated circuit.

10. The apparatus as recited in claim 1, wherein the first server comprises a blade server, and wherein said network adapter is embodied within said blade server.

11. The apparatus as recited in claim 1, further comprising: host interface logic, coupled to said transaction logic, to transfer data corresponding to the RDMA transactions to or from said first host memory.

12. The apparatus as recited in claim 11, wherein said host interface logic comprises PCI Express logic, and wherein PCI Express transactions are employed to transfer said data.

13. An apparatus, for performing remote direct memory access (RDMA) operations between a first server and a second server over an Ethernet fabric, the RDMA operations being initiated by execution of a verb according to a remote direct memory access protocol, the verb being executed by a central processing unit (CPU) on the first server, the apparatus comprising:

a first network adapter in the first server, to access a work queue element responsive to execution of the verb, and to transmit framed protocol data units (FPDUs) corresponding to the RDMA operations over a Transmission Control Protocol/Internet Protocol (TCP/IP) interface between the first and second servers, wherein the RDMA operations are responsive to said work queue element, and wherein said work queue element is provided within first host memory in the first server, the first host memory being coupled to the CPU via a memory controller, the first network adapter being coupled to the first host memory via both a host interface that is comprised in the first network adapter and the memory controller, the first host memory to store an adapter driver to provide control of the first network adapter, said first network adapter comprising:

transmit history information stores, to maintain a local copy of a subset of parameters in said work queue element, the transmit history information stores including additional parameters in addition to the parameters in the work queue element, the transmit history stores being in a local memory that is comprised in the first network adapter, the local memory being separate and distinct from the first host memory within which resides the work queue element, the transmit history information stores being to store the local copy and the additional parameters in one or more entries in one or more first-in-first-out (FIFO) buffers in the transmit history information stores, the one or more FIFO buffers being dynamically bound to the work queue element residing within the first host memory, the one or more entries in the one or more FIFO buffers in the transmit history information stores including a plurality of such entries, each respective one of the plurality of such entries including a respective field set and corresponding with a respective corresponding one of entries in the work queue element, each respective field set including a respective sendmsn field, a respective readmsn field, a respective first flag field, a respective startseqnum field, a respective finalseqnum field, a respective sackpres field, a respective notifyoncomp field, and a respective maximum upper level protocol data unit (MULPDU) field, the respective sendmsn field maintaining a current send message sequence number, the respective readmsn field maintaining a current read message sequence number, the respective startseqnum field maintaining an initial TCP sequence number of the respective one of the entries in the work queue elements, the finalseqnum field maintaining a final TCP sequence number of a message corresponding to the respective one of the entries in the work queue elements, the startseqnum field and the finalseqnum field being provided to the respective one of the plurality of entries in the one or more FIFO buffers in the transmit history information stores during creation of a first TCP segment of the message, the respective first flag field indicating whether a TCP streaming mode, other than RDMA over TCP, is being employed to perform a TCP-offload related data transaction associated with the respective corresponding one of the entries in the work queue element, the respective MULPDU field being to record a size of a MULPDU, associated with the respective corresponding one of the entries in the work queue element, that was in effect at a previous transmission time of the MULPDU, the size recorded in the MULPDU field to be used to re-segment one or more framed protocol data units (FPDU) and to rebuild one or more TCP segments that were transmitted during the previous transmission time in event of either of the following limitations numbered (1) and (2): (1) a network error associated with the one or more TCP segments, and (2) dynamic changing of the size of the MULPDU, the one or more TCP segments that are rebuilt consisting of a partial FPDU if the size of the MULPDU has been dynamically changed, the respective sackpres field being to indicate whether the respective MULPDU field has been reduced by allocation for a maximum sized SACK block, the respective notifyoncomp field being to indicate whether completion queue element generation is to occur for the first network adapter after outstanding TCP message segment acknowledgement; and a protocol engine, coupled to said transmit history information stores, to access said local copy of the subset of the parameters and the additional parameters, the subset being selected so as to enable the protocol engine to rebuild, based on the local copy, for retransmission one or more TCP segments corresponding to a subset of said FPDUs in the event of network transmission error, the subset also being selected so as to enable the protocol engine to determine, based on the local copy, if the RDMA operations have been completed;

the first network adapter also comprising IP address logic coupled both to a medium access controller (MAC) of the first network adapter and to the protocol engine, the IP address logic to contain IP address entries to be used as source IP addresses in transmitted messages, the first network adapter to compare with the IP address entries a destination IP address of an inbound datagram received by the MAC, the first network adapter to process the inbound datagram in accordance with a RDMA connection processing pipeline only if the destination IP address matches one of the IP address entries, the first network adapter to process the inbound datagram using a TCP/IP stack if no match to the destination IP address is in the IP address entries, the first network adapter including connection correlation logic to provide, for an outgoing transmission, mapping of a work queue number to TCP/IP routing parameters, the TCP/IP routing parameters including source and destination TCP ports and source and destination IP addresses; and a second network adapter, to receive said FPDUs, wherein reception of said FPDUs includes receiving said one or more TCP segments.

14. The apparatus as recited in claim 13, wherein said FPDUs direct that data corresponding to the RDMA operations be transferred from second host memory into said first host memory, wherein said second host memory corresponds to the second server.

15. The apparatus as recited in claim 13, wherein said FPDUs comprise data corresponding to the RDMA operations, and wherein said data is transferred from said first host memory into second host memory, wherein said second host memory corresponds to the second server.

16. The apparatus as recited in claim 13, wherein the first and second servers comprise first and second blade servers, respectively, and wherein said first and second network adapters are respectively embodied within said first and second blade servers.

17. The apparatus as recited in claim 13, wherein said first network adapter further comprises:
host interface logic, operatively coupled to said first host memory, to transfer data within one or more of said FPDUs to or from said first host memory.

18. The apparatus as recited in claim 17, wherein said host interface logic comprises PCI-X logic, and wherein PCI-X transactions are employed to transfer said data.

19. The apparatus as recited in claim 17, wherein said host interface logic comprises PCI Express logic, and wherein PCI Express transactions are employed to transfer said data.

20. An apparatus, for performing remote direct memory access (RDMA) operations between a first server and a second server over an Ethernet fabric, the RDMA operations being initiated by execution of a verb according to a remote direct memory access protocol, the verb being executed by a central processing unit (CPU) on the first server, the apparatus comprising:
a network adapter in the first server, the network adapter comprising transaction logic to process a work queue element corresponding to the verb, and to accomplish the RDMA operations over a Transmission Control Protocol/Internet Protocol (TCP/IP) interface between the first and second servers, wherein said work queue element resides within first host memory in the first server, the first host memory being coupled to the CPU via a memory controller, the network adapter being coupled to the first host memory via both a host interface that is comprised in the network adapter and the memory controller, the first host memory to store an adapter driver to provide control of the network adapter, said transaction logic comprising:
transmit history information stores to maintain a local copy of a subset of parameters in said work queue element, the transmit history information stores including additional parameters in addition to the parameters in the work queue element, the transmit history stores being in a local memory that is comprised in the network adapter, the local memory being separate and distinct from the first host memory within which resides the work queue element, the transmit history information stores being to store the local copy and the additional parameters in one or more entries in one or more first-in-first-out (FIFO) buffers in the transmit history information stores, the one or more FIFO buffers being dynamically bound to the work queue element residing within the first host memory, the one or more entries in the one or more FIFO buffers in the transmit history information stores including a plurality of such entries, each respective one of the plurality of such entries including a respective field set and corresponding with a respective corresponding one of entries in the work queue element, each respective field set including a respective sendmsn field, a respective readmsn field, a respective first flag field, a respective startseqnum field, a respective finalseqnum field, a respective sackpres field, a respective notifyoncomp field, and a respective maximum upper level protocol data unit (MULPDU) field, the respective sendmsn field maintaining a current send message sequence number, the respective readmsn field maintaining a current read message sequence number, the respective startseqnum field maintaining an initial TCP sequence number of the respective one of the entries in the work queue elements, the finalseqnum field maintaining a final TCP sequence number of a message corresponding to the respective one of the entries in the work queue elements, the startseqnum field and the finalseqnum field being provided to the respective one of the plurality of entries in the one or more FIFO buffers in the transmit history information stores during creation of a first TCP segment of the message, the respective first flag field indicating whether a TCP streaming mode, other than RDMA over TCP, is being employed to perform a TCP-offload related data transaction associated with the respective corresponding one of the entries in the work queue element, the respective MULPDU field being to record a size of a MULPDU, associated with the respective corresponding one of the entries in the work queue element, that was in effect at a previous transmission time of the MULPDU, the size recorded in the MULPDU field to be used to re-segment one or more framed protocol data units (FPDU) and to rebuild one or more TCP segments that were transmitted during the previous transmission time in event of either of the following limitations numbered (1) and (2): (1) a network error associated with the one or more TCP segments, and (2) dynamic changing of the size of the MULPDU, the one or more TCP segments that are rebuilt consisting of a partial FPDU if the size of the MULPDU has been dynamically changed, the respective sackpres field being to indicate whether the respective MULPDU field has been reduced by allocation for a maximum sized SACK block, the respective notifyoncomp field being to indicate whether completion queue element generation is to occur for the adapter after outstanding TCP message segment acknowledgement; and a protocol engine, coupled to said transmit history information stores, to access said MULPDU, the protocol engine accessing said local copy of the subset of the parameters and the additional parameters, the subset being selected so as to enable the protocol engine to rebuild, based on the local copy, for retransmission one or more TCP segments corresponding to the RDMA operations in event of network transmission error, the subset also being selected so as to enable the protocol engine to determine, based on the local copy, if the RDMA operations have been completed;

the transaction logic in the network adapter also comprising IP address logic coupled both to a medium access controller (MAC) of the network adapter and to the protocol engine, the IP address logic to contain IP address entries to be used as source IP addresses in transmitted messages, the network adapter to compare with the IP address entries a destination IP address of an inbound datagram received by the MAC, the network adapter to process the inbound datagram in accordance with a RDMA connection processing pipeline only if the destination IP address matches one of the IP address entries, the network adapter to process the inbound datagram using a TCP/IP stack if no match to the destination IP address is in the IP address entries, the transaction logic comprising connection correlation logic to provide, for an outgoing transmission, mapping of a work queue number to TCP/IP routing parameters, the TCP/IP routing parameters including source and destination TCP ports and source and destination IP addresses.

21. The apparatus as recited in claim 20, further comprising:
host interface logic, coupled to said transaction logic, to transfer data corresponding to the RDMA transactions to or from said first host memory.

22. A method for performing remote direct memory access (RDMA) operations between a first server and a second server over an Ethernet fabric, the RDMA operations being initiated by execution of a verb according to a remote direct memory access protocol, the verb being executed by a central processing unit (CPU) on the first server, the method comprising:

processing by a network adapter in the first server a work queue element corresponding to the verb, wherein the work queue element resides within a work queue that is within first host memory in the first server, the first host memory being coupled to the CPU via a memory controller, the network adapter being coupled to the first host memory via both a host interface that is comprised in the network adapter and the memory controller, the first host memory to store an adapter driver to provide control of the network adapter; and accomplishing by the network adapter the RDMA operations over a Transmission Control Protocol/Internet Protocol (TCP/IP) interface between the first and second servers, wherein said accomplishing comprises:
maintaining in transmission history information stores a local copy of a subset of parameters in the work queue element, the transmission history information stores including additional parameters in addition to the parameters in the work queue element, the transmit history stores being in a local memory that is comprised in the network adapter, the local memory being separate and distinct from the first host memory within which resides the work queue element, the transmit history information stores being to store the local copy and the additional parameters in one or more entries in one or more first-in-first-out (FIFO) buffers in the transmit history information stores, the one or more FIFO buffers being dynamically bound to the work queue element residing within the first host memory, the one or more entries in the one or more FIFO buffers in the transmit history information stores including a plurality of such entries, each respective one of the plurality of such entries including a respective field set and corresponding with a respective corresponding one of entries in the work queue element, each respective field set including a respective sendmsn field, a respective readmsn field, a respective first flag field, a respective startseqnum field, a respective finalseqnum field, a respective sackpres field, a respective notifyoncomp field, and a respective maximum upper level protocol data unit (MULPDU) field, the respective sendmsn field maintaining a current send message sequence number, the respective readmsn field maintaining a current read message sequence number, the respective startseqnum field maintaining an initial TCP sequence number of the respective one of the entries in the work queue elements, the finalseqnum field maintaining a final TCP sequence number of a message corresponding to the respective one of the entries in the work queue elements, the startseqnum field and the finalseqnum field being provided to the respective one of the plurality of entries in the one or more FIFO buffers in the transmit history information stores during creation of a first TCP segment of the message, the respective first flag field indicating whether a TCP streaming mode, other than RDMA over TCP, is being employed to perform a TCP-offload related data transaction associated with the respective corresponding one of the entries in the work queue element, the respective MULPDU field being to record a size of a MULPDU, associated with the respective corresponding one of the entries in the work queue element, that was in effect at a previous transmission time of the MULPDU, the size recorded in the MULPDU field to be used to re-segment one or more framed protocol data units (FPDU) and to rebuild one or more TCP segments that were transmitted during the previous transmission time in event of either of the following limitations numbered (1) and (2): (1) a network error associated with the one or more TCP segments, and (2) dynamic changing of the size of the MULPDU, the one or more TCP segments that are rebuilt consisting of a partial FPDU if the size of the MULPDU has been dynamically changed, the respective sackpres field being to indicate whether the respective MULPDU field has been reduced by allocation for a maximum sized SACK block, the respective notifyoncomp field being to indicate whether completion queue element generation is to occur for the network adapter after outstanding TCP message segment acknowledgement; and accessing the local copy of the subset of the parameters and the additional parameters, the subset being selected so as to enable the network adapter to rebuild, based on the local copy, for retransmission one or more TCP segments corresponding to the RDMA operations in event of network transmission error, the subset also being selected so as to enable the network adapter to determine, based on the local copy, if the RDMA operations have been completed;

comparing, by the network adapter, IP address entries with a destination IP address of an inbound datagram received by a medium access controller (MAC) of the network adapter, the IP address entries being contained in IP address logic coupled both to the MAC and to a protocol engine in the network adapter, the IP address entries to be used as source IP addresses in transmitted messages, the network adapter to process the inbound datagram in accordance with a RDMA connection processing pipeline only if the destination IP address matches one of the IP address entries, the network adapter to process the inbound datagram using a TCP/IP stack if no match to the destination IP address is in the IP address entries, the network adapter comprising connection correlation logic to provide, for an outgoing transmission, mapping of a work queue number to TCP/IP routing parameters, the TCP/IP routing parameters including source and destination TCP ports and source and destination IP addresses.

23. The method as recited in claim 22, wherein said accomplishing further comprises:

transferring data corresponding to the RDMA operations from second host memory into the first host memory, wherein the second host memory corresponds to the second server.

24. The method as recited in claim 22, wherein said accomplishing further comprises:

transferring data corresponding to the RDMA operations from the first host memory into second host memory, wherein the second host memory corresponds to the second server.

25. The method as recited in claim 22, wherein said processing comprises:

via host interface logic, transferring data corresponding to the RDMA operations to or from the first host memory.

26. The method as recited in claim 25, wherein the host interface logic comprises PCI-X logic, and wherein PCI-X transactions are employed to transfer the data.

27. The method as recited in claim 25, wherein the host interface logic comprises PCI Express logic, and wherein PCI Express transactions are employed to transfer the data.

* * * * *